(12) United States Patent
Kluck

(10) Patent No.: US 8,091,604 B2
(45) Date of Patent: Jan. 10, 2012

(54) BROADCAST-RECEIVING AUTOMATIC WINDOW COVERING

(76) Inventor: Steven Anthony Kluck, San Antonio, TX (US)

( * ) Notice: Subject to any disclaimer, the term of this patent is extended or adjusted under 35 U.S.C. 154(b) by 148 days.

(21) Appl. No.: 12/719,395

(22) Filed: Mar. 30, 2010

(65) Prior Publication Data
US 2011/0240232 A1    Oct. 6, 2011

(51) Int. Cl.
*E05F 15/20* (2006.01)

(52) U.S. Cl. ............................................. 160/1; 160/5

(58) Field of Classification Search .................. 160/1, 5; 318/480
See application file for complete search history.

(56) References Cited

U.S. PATENT DOCUMENTS

| | | | | |
|---|---|---|---|---|
| 5,760,558 A | * | 6/1998 | Popat | ............................ 318/480 |
| 7,977,904 B2 | * | 7/2011 | Berman et al. | ................ 318/480 |
| 2006/0207730 A1 | * | 9/2006 | Berman et al. | ................ 160/310 |

* cited by examiner

*Primary Examiner* — Katherine Mitchell
*Assistant Examiner* — Johnnie A Shablack

(57) ABSTRACT

An apparatus and method for the automatic adjustment of window coverings and the like, receiving externally-broadcast time-and-date signal as a temporal reference for making scheduled adjustments to the window covering. One embodiment comprises an antenna, a conventional broadcast time signal receiver/decoder, a motorized adjustable window covering, a conventional microcontroller with non-volatile memory, and human-operated controls for on-demand adjustments and memory commands. The broadcast time signal provides high reliability, high precision timing control, which allows synchronization of multiple units in separate windows, without the need for a central control system. Some embodiments of the invention have a learning function which is operated by making an adjustment in a conventional, familiar manner, combined with a learn command.

17 Claims, 19 Drawing Sheets

| DATES: | 325-20 | 21-51 | 52-79 | 80-110 | 111-140 | 141-201 | 202-232 | 233-263 | 264-293 | 294-324 |
|---|---|---|---|---|---|---|---|---|---|---|
| | YSEG 0 | YSEG 1 | YSEG 2 | YSEG 3 | YSEG 4 | YSEG 5 | YSEG 6 | YSEG 7 | YSEG 8 | YSEG 9 |
| DSEG A | → | 0 | ☆ 1 | → | → | → | → | → | → | → |
| DSEG B | 0 | 0 | 0 | 0 | 0 | 0 | 0 | 0 | 0 | 0 |
| DSEG C | → | 0 | ☆ 14 | → | → | → | → | → | → | → |
| DSEG D | 0 | 0 | 0 | 0 | 0 | 0 | 0 | 0 | 0 | 0 |
| DSEG E | 0 | 0 | 0 | 0 | 0 | 0 | 0 | 0 | 0 | 0 |
| DSEG F | 0 | 0 | 0 | 0 | 0 | 0 | 0 | 0 | 0 | 0 |
| DSEG G | 0 | 0 | 0 | 0 | 0 | 0 | 0 | 0 | 0 | 0 |
| DSEG H | 0 | 0 | 0 | 0 | 0 | 0 | 0 | 0 | 0 | 0 |
| DSEG I | 0 | 0 | 0 | 0 | 0 | 0 | 0 | 0 | 0 | 0 |
| DSEG J | → | 0 | 0 | 0 | ☆ 1 | → | → | ☆ 14 | → | → |
| DSEG K | 0 | 0 | 0 | 0 | 0 | 0 | 0 | 0 | 0 | 0 |
| DSEG L | 0 | 0 | 0 | 0 | 0 | 0 | 0 | 0 | 0 | 0 |
| DSEG M | → | 0 | ☆ 7 | → | ☆ 1 | → | → | ☆ 7 | → | → |
| DSEG N | 0 | 0 | 0 | 0 | 0 | 0 | 0 | 0 | 0 | 0 |
| DSEG O | 0 | 0 | 0 | 0 | 0 | 0 | 0 | 0 | 0 | 0 |
| DSEG P | 0 | 0 | 0 | 0 | 0 | 0 | 0 | 0 | 0 | 0 |

PRE-DAWN POSITION: 26
POST-DUSK POSITION: 24

FIG. 6D

|  | START TIME (LST) | START DATE (ORD) | SETPOINT POSITION | YSEG DURATION (DAYS) |
|---|---|---|---|---|
| INSTR: 1 | 06:57:00 AM | 58 | 14 | 311 |
| 2 | 04:13:00 PM | 58 | 7 | 76 |
| 3 | 01:22:00 PM | 134 | 1 | 122 |
| 4 | 04:00:00 PM | 134 | 1 | 122 |
| 5 | 01:45:00 PM | 256 | 14 | 146 |
| 6 | 04:26:00 PM | 256 | 7 | 146 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |
| ⋮ | ⋮ | ⋮ | ⋮ | ⋮ |
| n | 0 | 0 | 0 | 0 |
| PRE-DAWN POSITION: 26 | | | | |
| POST-DUSK POSITION: 24 | | | | |

FIG. 6E

BROADCAST-RECEIVING AUTOMATIC WINDOW COVERING

CROSS-REFERENCE TO RELATED APPLICATIONS

Not Applicable.

BACKGROUND-PRIOR ART

The following is a listing of some prior art that presently appears relevant:

U.S. Patents

| Pat. No. | Issue Date | Patentee |
| --- | --- | --- |
| 1,187,381 | Jun. 13, 1916 | Palmer |
| 1,525,781 | Feb. 10, 1925 | Sheppard |
| 2,083,726 | Jun. 15, 1937 | Mason |
| 2,962,647 | Nov. 29, 1960 | Borenstein |
| 3,337,992 | Aug. 29, 1967 | Tolson |
| 3,429,298 | Feb. 25, 1969 | Thomason |
| 4,131,831 | Dec. 26, 1978 | Bochenek et al |
| 4,173,721 | Nov. 6, 1979 | Louis |
| 4,610,294 | Sep. 9, 1986 | Anesi et al |
| 4,664,169 | May 12, 1987 | Osaka et al |
| 4,958,112 | Sep. 18, 1990 | Zerillo |
| 5,164,856 A | Nov. 17, 1992 | Zhang et al |
| 5,371,447 A | Dec. 6, 1994 | Boss |
| 5,413,161 A | May 9, 1995 | Corazzini |
| 5,511,601 A | Apr. 30, 1996 | Worthington |
| 5,598,000 A | Jan. 28, 1997 | Popat |
| 5,605,013 A | Feb. 25, 1997 | Hogston |
| 5,663,621 A | Sep. 2, 1997 | Popat |
| 5,675,487 A | Oct. 7, 1997 | Patterson et al |
| 5,760,558 A | Jun. 2, 1998 | Popat |
| 6,024,156 A | Feb. 15, 2000 | Chu |
| 6,100,659 A | Aug. 8, 2000 | Will et al |
| 6,388,404 B1 | May 14, 2002 | Schnebly et al |
| 7,085,627 B2 | Aug. 1, 2006 | Bamberger et al |
| 7,111,952 B2 | Sep. 26, 2006 | Veskovic |
| 7,389,806 B2 | Jun. 24, 2008 | Kates |
| 7,417,397 B2 | Aug. 26, 2008 | Berman et al |
| 7,468,591 B2 | Dec. 23, 2008 | Bruno |
| 7,588,067 B2 | Sep. 15, 2009 | Veskovic |

U.S. Patent Application Publications

| Publication No. | Publ. Date | Applicant |
| --- | --- | --- |
| 2005/0269041 A1 | Dec. 8, 2005 | Anderson et al |
| 2008/0112269 A1 | May 15, 2008 | Lawton |

Overview of Coverings for Architectural Openings

The exterior openings in buildings, or in other words architectural openings, often require coverings to exclude or to regulate selectively things that would normally pass through easily. In some cases, a non-adjustable covering can serve multiple purposes. For instance a mesh screen across the bounded area of a window can exclude insects while substantially allowing daylighting and ventilation. In other instances, the performance of a fixed covering is by itself insufficient. For example, fixed, glazed windows are known to be the windows least likely to leak air or water because they have no operable mechanisms. Nevertheless, windows with moving sashes, that is, frames in which the glass is mounted, which can be slid or rotated open, thus having an adjustable attribute, are widely installed where there is a periodic need for added ventilation.

Aside from movable glazed window sashes, doors make up another category of adjustable coverings for exterior openings. Like windows, doors may be designed to pivot open and closed, or alternately to slide open and closed across the area of an opening.

Coverings for exterior openings are used not only to regulate ventilation. When an exterior part of a building is exposed to sunlight, the use of windows allows light to be used for the benefits of interior illumination and heat gain, sometimes with preference to one or the other.

The quantity and quality of exposure to sunlight for an exterior part of a building depend on numerous celestial, meteorological, terrestrial, and architectural factors. Among them are the time of day, the time of year, and the northern or southern latitude of the building. Meteorological factors include the quantity-, size-, structure-, and altitude-distribution of water/ice particles making up clouds/fog/precipitation. Terrestrial factors include topography and vegetation in the vicinity of the building. Architectural factors include geographic bearings of exterior parts of a building and the presence of architectural features or other buildings that may be above, below, in front of, or beside the a particular part of the exterior.

A further multiplicity of factors affecting sunlight exposure can be seen when the factors already mentioned are combined with one another. For example, a house in a temperate zone may have a window facing west that may be shaded in summertime by the leaves of nearby deciduous trees. In the winter, the same window may only be slightly shaded by barren branches. For a second example, an office building in the northern hemisphere may have a window facing south, that may be protected from any direct sunlight in the summer by a building overhang, but may receive direct rays in winter months. For a third example, a cafeteria by a grassy hillside in the northern polar climate zone may have a window facing north, which is exposed to a significant amount of green-hued light during a growing season, but to even greater peak amounts of whitish light when snow covers the ground.

Sometimes it is appropriate to change certain characteristics of a window by the addition of adjustable window coverings, exterior to-, or interior to-, glazed sashes, or between lites of multiple-glazed sashes. Types of window coverings that have one or more adjustable attributes include draperies, curtains, horizontal venetian blinds, vertical blinds, exterior plain hinged shutters, rolling shutters, roller shades, roman shades, pleated shades, and panel track systems.

It is also possible to control light passing through a window sash without installing any movable, mechanical devices. A category of systems sometimes called "smart glass" includes devices that use electrochromic or liquid crystal techniques to vary tint or diffuseness levels in what would otherwise appear to be conventional glass. Thus, a sash which covers an architectural opening can have a useful, yet non-mechanical, adjustable attribute.

Even after sunset, often the coverings of exterior windows require adjustment. In one case, when artificial lighting is used in the interior of a residence at night, draperies may be closed so that privacy is maintained. In another case, in a display window of a shop, solar shades may be rolled up after sunset so that lighted displays are more easily viewable.

Whether the adjustable attribute of a covering for an architectural opening is designed to be a) illumination amount, b) openness for ventilation, c) lighting hue, d) thermal conductivity, e) diffuseness, f) optical clarity for view-through, g) limitation of direct solar rays, h) air convection limitation, g) degree of tint; some combination of the above; or some other preferred quantity or quality, there have been a number of inventions which have sought to add degrees of automation to that adjustment which would have normally required the routine attention of some person.

Automation of Coverings: Discussion of Specific Prior Art

U.S. Pat. No. 1,187,381 to Palmer shows a method by which a conventional wind-up alarm clock is combined with a mechanism to release a window sash, allowing the sash to close by its weight and the weight of other components, at a predetermined time of the user's choice. Thus a window sash, as a covering for an architectural opening, is automated, whereby a person sleeping can benefit from exterior ventilation for some preset time interval, after which the sash is gently lowered, without further action by the sleeper. In this case, the degree of automation is a one-time adjustment to the limit of the adjustable attribute, which is the window aperture. After the automatic closure, the mechanism must be mechanically reset by the user before each and every successive automatic closure. The time shown on the clock must be read by the user, and any clock time adjustment needed must be done manually. Likewise, the alarm time setting must be read by the user in predetermining the time of closure. If the clock runs slow or fast, then only the user can determine if and when a correction is needed. Although seasonal changes in climate may make ventilation less appropriate, the yearly cycle of alarm time adjustments can be repeated in successive years only by additional actions of the user.

U.S. Pat. No. 2,083,726 to Mason shows the application of electromechanical components to the task of extending and retracting roller shades and awnings for regulation of sunlight through an architectural opening. The components specified include electric motors, switches, electromagnetic braking devices, and conventional time switches. The invention provides for adjustment of a position from an initial extreme scalar value to the opposite extreme scalar value at a predetermined time of day followed by a return to the initial position value at another predetermined time. Furthermore, the time switch can repeat the same cycle, on the same schedule, on multiple successive days, without further attention by the user. However, the specification does not explain ways to avoid the user's attention to initial reading and setting of the time clock nor to maintaining accuracy of the time. And although the stated object involves regulation of sunlight, no method is given to free the user from any need to make seasonal adjustments to the schedule for sunrise and sunset variation, nor from the manual repetition of seasonal changes in progressing years.

U.S. Pat. No. 2,962,647 to Borenstein provides a method of automation of roller awnings which allows scheduled adjustments not only to the two extreme limits of position, but to intermediate positions as well, by the use of a timer to stop the motion before the limit of travel can be reached. The basic reliability limitations of a conventional time switch and the need to set, re-adjust and monitor the correctness of the time switch are not avoided, however.

U.S. Pat. No. 3,337,992 to Tolson teaches the automation of windows and similar openings with the inclusion of a digital electronic control system. The inclusion of a time control device and servo control devices allows for multiple automatic adjustments, according to a predetermined schedule, to predetermined position setpoints. Even so, there is no inclusion of means to free the user from the tasks of setting the time, maintaining accuracy of time, nor making seasonal adjustments to the scheduled adjustments.

U.S. Pat. No. 7,417,397 to Berman et al indicates the possible inclusion of a clock within a fairly complex automatic shade control system, but does not state the inclusion of a means to receive radio broadcast time signals nor the benefits thereof. Beyond time-based control, the patent includes the use of algorithms for multiple types of optimization based on many alternate kinds of inputs. The specification teaches the use of a central control system to achieve a uniform interior/exterior appearance of groups of windows, but not without the use of system components to coordinate the timing of synchronized position changes to individual windows. Further, the patent does not teach the benefits of using a publicly-available broadcast time signal to provide simplicity of automatic control as from the user's perspective nor to increase the reliability of automatic control.

Advantages

It is therefore an object of this invention to provide a method of automation for window coverings which:

a) Follows the adjustment time schedule or timetable predetermined by users, yet can automatically adapt its function for the seasonally changing times of sunrise and sunset;

b) Remembers and periodically reverts to user settings from a previous year, even after having been manually adjusted and programmed at various times in the days and seasons intervening;

c) Provides reliable, precise timing to a fraction of a second for window covering adjustment;

d) Requires neither the installation nor maintenance of a central control system to achieve synchronization in the movements of draperies, blinds, and the like, in various separate windows;

e) Frees the user from any need to read a display, to tell time, nor to use any method to set a clock; nor to use a keypad, nor to use words or numbers in any way; thus it requires no literacy nor numeracy abilities to perform calendar scheduled programming;

f) Is programmable in low light conditions, and/or by users with limited visual acuity;

g) Provides automatic recovery of precise timing synchronization after power source interruptions;

h) Retains familiar and conventional methods of manual user adjustment common in non-automated window coverings, allowing different users to adopt (or not adopt) the automation technology at their own pace, at their own level of comfort and convenience;

i) Is manually adjustable by familiar and conventional methods even in the event of failure of electrical power supply;

j) Is usable in conjunction with all types of adjustable window coverings; and k) Requires fewer components, is less expensive, and has simpler installation than other types of automatic window covering systems.

DESCRIPTION OF DRAWINGS

FIG. 6D is a timetable implemented within the first embodiment depicting the internal representation of a schedule created in an example of operation.

FIG. 6E is a table implemented within an alternate embodiment depicting the internal representation of scheduling instructions created in an example of operation.

LIST OF REFERENCE NUMERALS

Figure 2:
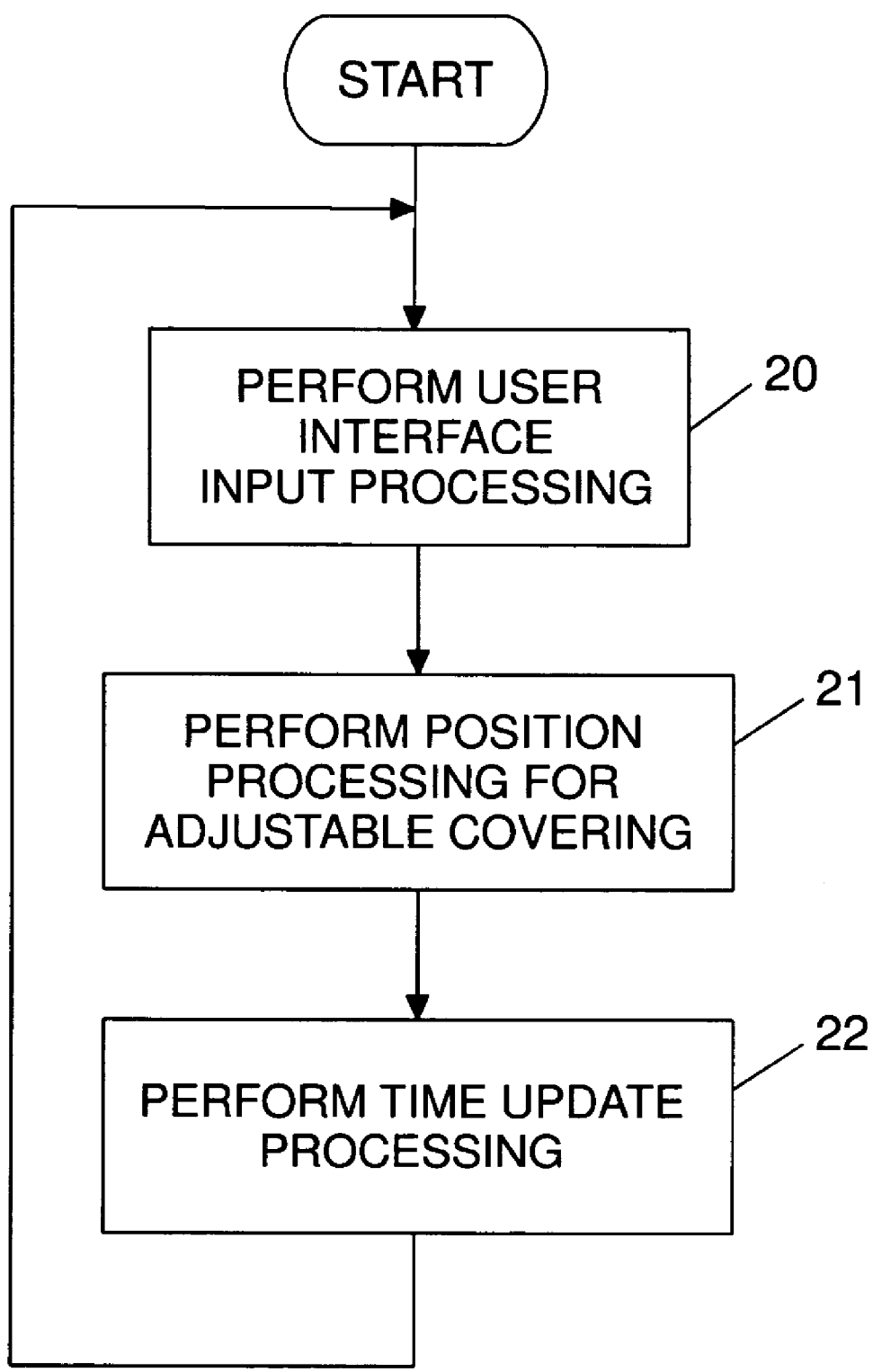
FIG. 2 is a high level flow diagram of the software executed within a first embodiment of the invention.
Figure 3:
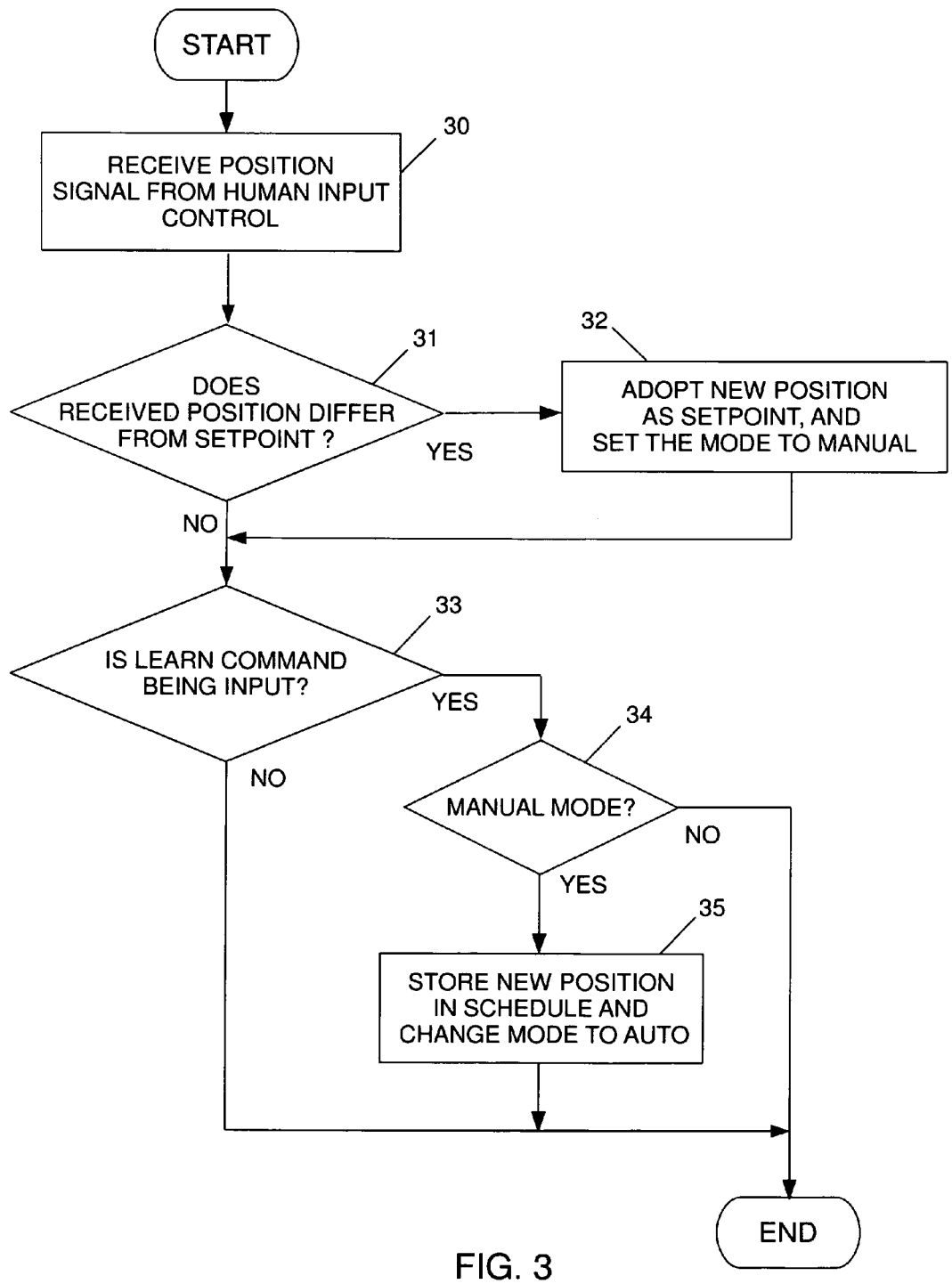
FIG. 3 is a flow diagram showing further detail of user interface input processing, as performed by the software.
Figure 4:
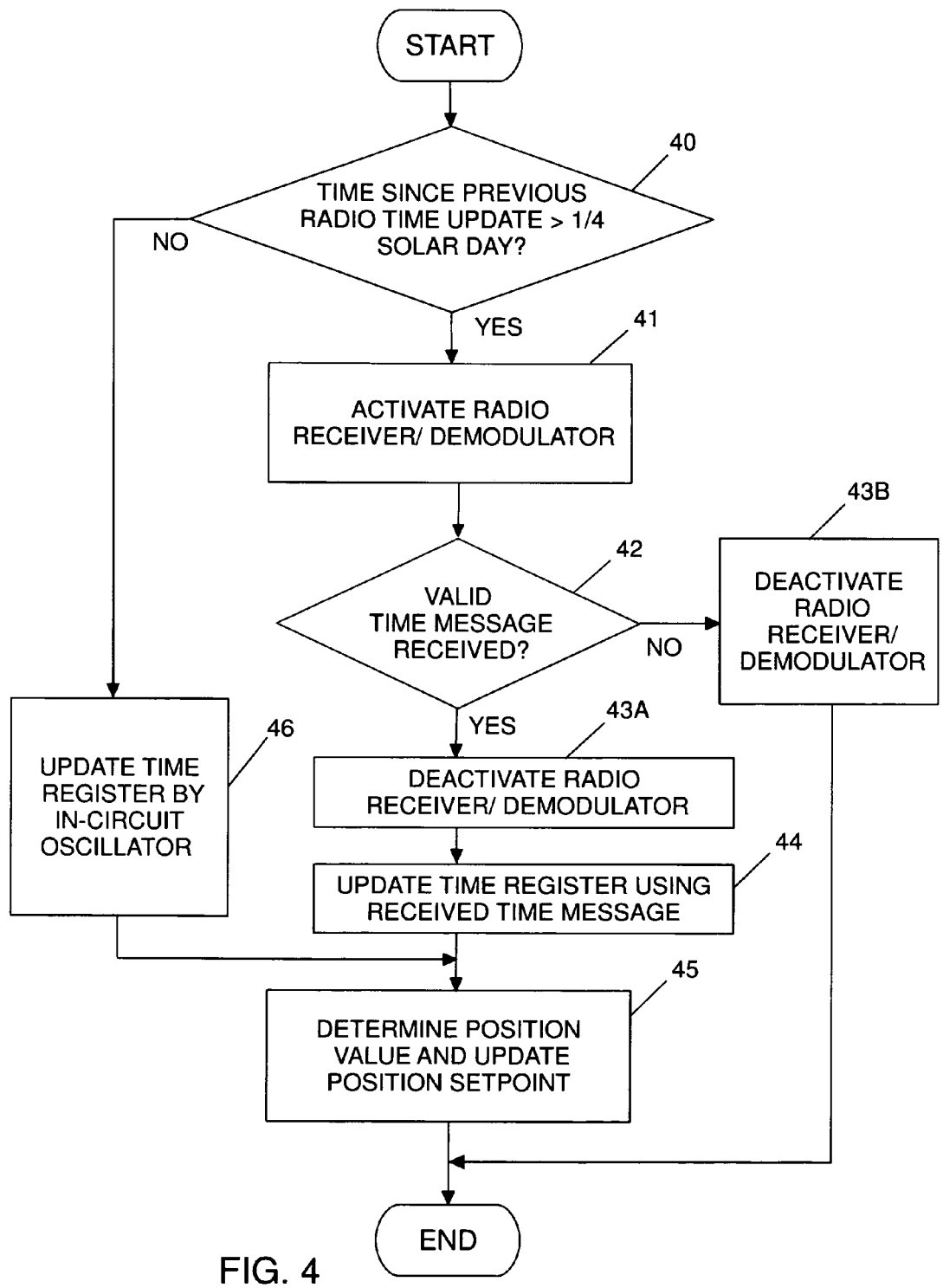
FIG. 4 is a flow diagram showing further detail of time update processing, as performed by the software.
Figure 5:
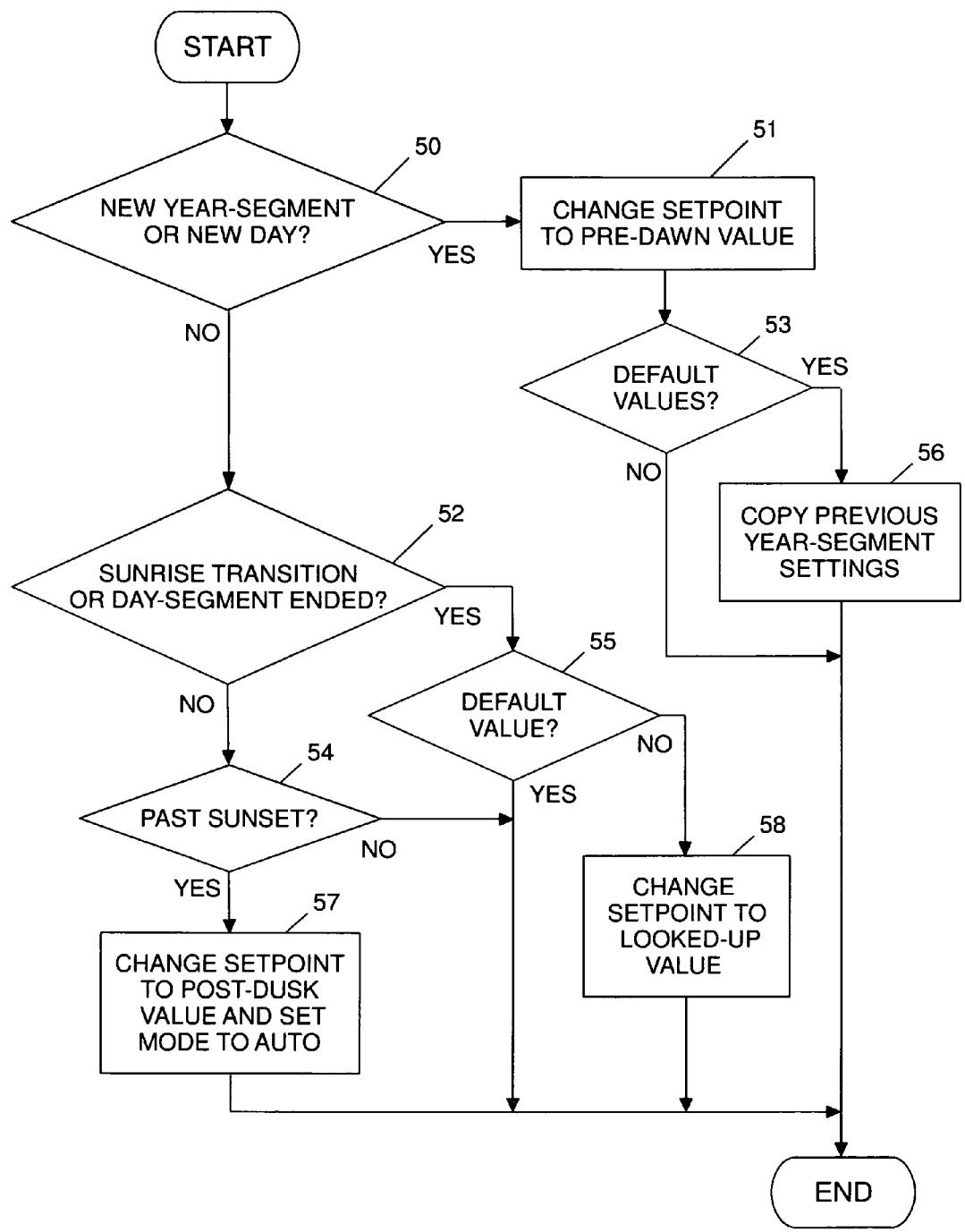
FIG. 5 is a flow diagram showing further detail of position setpoint update processing.

Description and Reference Number time signal or radio time standard 10
transmission station 11
automated covering 12
antenna 13
radio receiver/demodulator 14
microcontroller 15
adjustable window covering 16
ladder string drum rotor 70
Software Steps of FIG. 2: 20-22
Software Steps of FIG. 3: 30-35
Software Steps of FIG. 4: 40-42, 43A, 43B, 44-46
Software Steps of FIG. 5: 50-58
tilt adjustment wand 71
lift adjustment control 72
slats 73
headrail 80
microcontroller circuit board 81
dry cell batteries 82
servomotor 83
antenna assembly 85
universal joint 86
adjustment shaft 92
upper guide 93
lower guide 94
coil spring 95
annular coupling 96
D-type shaft 97
rotary quadrature encoder 98
cut-out 100
control module 101
installation code pushbuttons 102
terminal pads 103
drive motor module 104
coupling 105
momentary switch 151
yoke 153
slip clutch 155
rotary switch 156
D-type drive shaft 160
bevel gear set 161
potentiometer 162
slip clutch 163
gearmotor 164
mechanical drive train 165
horizontal shaft 166
control-and-propulsion module 171
drapery rod 172
gearmotor 173
drive wheel 174
drive rack 175
curtain 176
curtain track 177
pull wand 178
rotary switch 179
momentary switch 180
swing arm 181
track 182
potentiometer 183
circuit board 184
arm joint 185
clutch 186

Overall Block Diagram of a First Embodiment

Figure 1:
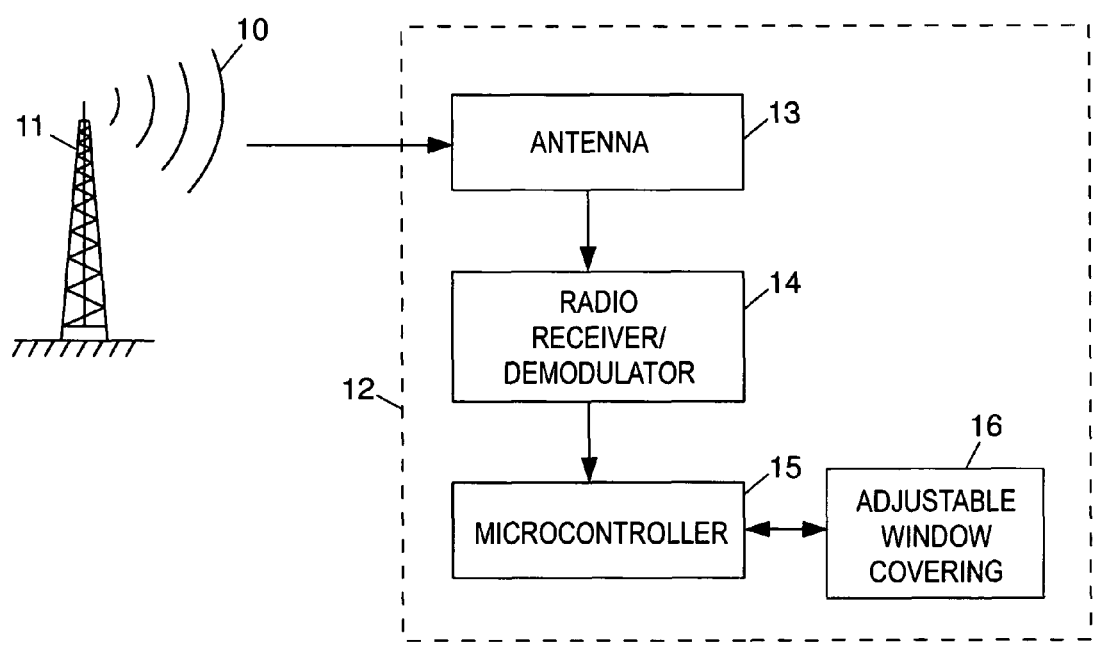
FIG. 1 is a block diagram of an apparatus for the automatic adjustment of a covering for a window or other architectural opening, said apparatus receiving an externally-broadcast time signal as a time reference.

FIG. 1 is a diagram of an apparatus to provide for the automatic adjustment of a covering for an architectural opening (architectural opening not shown), such covering being for example a door, a louver assembly, a window sash, draperies, or blinds. The automated covering 12, receives an externally-broadcast time signal or radio time standard 10 as a temporal reference for making scheduled adjustments. It includes an antenna 13, which is of a conventional type for low-frequency radio reception, a radio receiver/demodulator 14, a microcontroller 15, and an adjustable covering for an architectural opening or an adjustable window covering 16, which is of a design that accepts electronic command signals.

The time standard is a ground-based, publicly-available, digital modulated radio signal, which is broadcast continuously from a transmission station 11 such as WWVB in Fort Collins, Colo.; DCF 77 in Germany; HBG in Switzerland; MSF in Great Britain; or Hagane-yama in Japan. Such time signals typically are receivable over a wide-, even continental-geographical area. Other basic kinds of time signals are described below within the alternate embodiments.

Introducing Components of the First Embodiment

The antenna 13 is preferably a ferrite-core loop antenna that is mounted to the stationary structure of the window covering. For optimum reception, the antenna is located substantially within the perimeter of the architectural opening. The antenna is connected to the radio receiver/demodulator 14. The antenna is preferably of a type suitable for use with frequencies in the range of 40 to 80 kilohertz.

The radio receiver/demodulator 14 is a circuit that is preferably based on a commercially available CME 8000 integrated circuit manufactured by C-MAX Time Solutions GmbH of Heilbron, Germany. The CME 8000 is available pre-assembled into a circuit module of C-MAX part number CMMR-8P-MF, which includes a suitable antenna. In the first embodiment, The radio receiver/demodulator is interfaced to connections of input/output lines of the microcontroller as described below. In particular, input/output connections are used to activate and enable the CME 8000 chip and to provide system clock pulses as specified by the manufacturer. Another connection described below is for a data-ready signal from the CME 8000 to the microcontroller. Still another connection is used for a data-clock signal from the microcontroller to the CME 8000 chip. Other interfacing details are discussed in the circuit diagram description below. Whatever type of radio receiver circuitry is used, consideration should be given to temperature compensation allowing the unit to receive the intended broadcast wavelength over the entire design temperature range of the installation environment, if high reliability is to be expected.

The microcontroller 15 is a digital control unit including software that will be described in more detail to follow. Preferably the microcontroller is configured to be clocked with an oscillator with a crystal or ceramic element resonator. The crystal oscillator allows the software to keep accurate time for schedule- and calendar-based operation even if the radio receiver/demodulator 14 is activated only once per day. Alternative use of less-precise system clock sources is described with the alternate embodiments.

Outputs from the microcontroller 15 also include a control signal to the adjustable window covering. In the first embodiment, the control signal is a digitally proportional signal. The signal's maximum period is approximately 20 milliseconds. The signal consists of a pulse of a variable duty cycle, ranging in duration between 1 to 2 milliseconds, approximately. The resulting absolute adjustment of the window covering is approximately proportional to the pulse duration.

Inputs to the microcontroller 15 also include a user interface adjustment signal and a Logging or Learn command signal. In the first embodiment, the physical user interface for the adjustment signal is a tilt-adjustment wand with a rotary quadrature encoder which will be described further to follow. Two single-bit data lines from the rotary encoder provide the rotary position reference signal to the microcontroller. In the first embodiment, the same tilt adjustment wand also provides the physical user interface for the Learn command, producing a single-bit input to the microcontroller, as will also be described further to follow.

In the first embodiment, the inputs to the microcontroller also include user controls that are intended only be used by the initial installer of the system. The installer user controls consist of two momentary pushbutton switches, which are used to input a binary code used by the software to set the approximate latitude and longitude of the installation in non-volatile memory of the microcontroller.

The microcontroller selected for use in the first embodiment should have 12 or more programmable input/output lines and should include at least 256 bytes of non-volatile memory. At least an eight-bit architecture and option of a crystal-controlled system clock are appropriate. Devices with at least 4K words of program memory should be considered. An example of a suitable device is the PIC16F877A microcontroller manufactured by Microchip Technology Incorporated, of Chandler, Ariz.

The adjustable window covering 16, in the first embodiment is a modified conventional venetian blind unit having a headrail, a manually-operated mechanical lift adjustment control, and a plurality of horizontal slats. From the standpoint of the automated system, the salient features of the adjustable covering are a digitally-proportional controlled servomotor which is mechanically linked to directly drive the ladder string drum rotor 70, and a conventional tilt-adjustment wand coupled via a universal joint or the like, to a quadrature rotary encoder. Other details of the components and structure of the venetian blind unit are to follow below.

Figure 7:
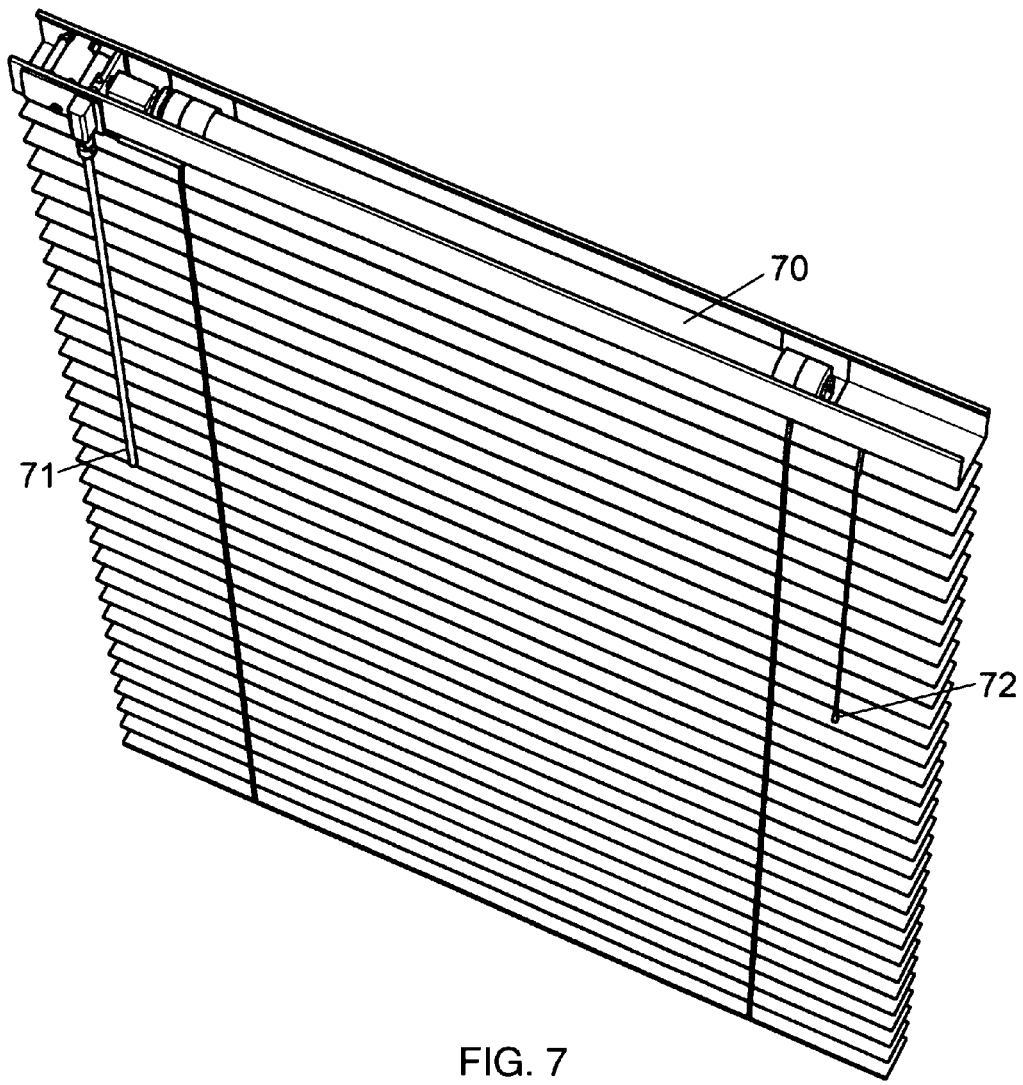
FIG. 7 is a view of the first embodiment of the invention in which a window is the subjected architectural opening, and conventional venetian blinds are the subjected covering.

FIG. 7 is an oblique view of the first embodiment providing for the automatic adjustment of a set of venetian blinds as covering for an architectural opening. A headrail 80, is installed in a stationary manner at an upper location of an architectural opening. Within the headrail, a ladder string drum rotor 70, as in conventional venetian blind headrail units, rotates to change the angle of a plurality of slats 73. A manually-operated mechanical lift adjustment control 72, in the form of a gathered set of pull chords, provides the option to raise the slats by hand in a conventional manner.

A tilt adjustment wand 71, as a hand-holdable rotary handle, appears and operates like the tilt adjustment wand of a conventional set of blinds, but actually serves to provide human input to the automated portion of the system. Axial rotation of the wand provides signals for the slat angle to be increased or decreased. In addition, axial pulling of the wand provides human input of a learn command, with function as described below. Thus two kinds of inputs are combined in a one-touch user interface.

The ladder string drum rotor 70 is designed for low-torque rotation, having low moment of inertia and low-friction bearings.

Figure 8:
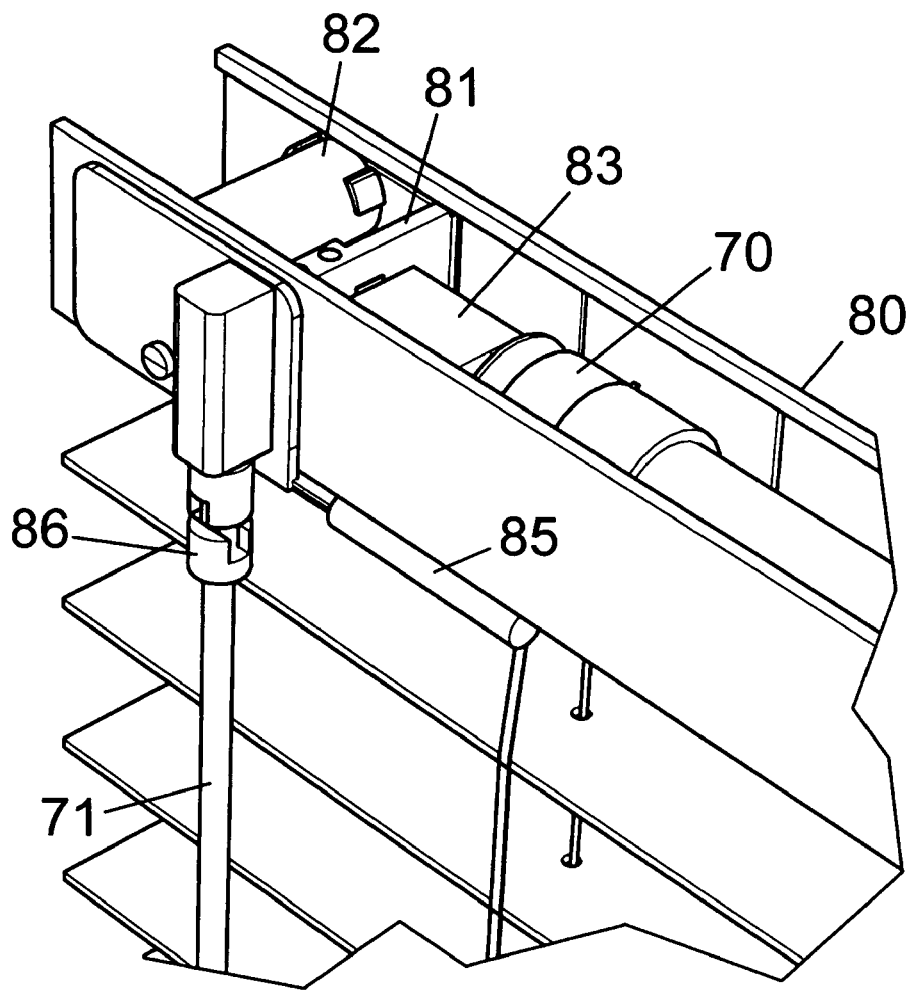
FIG. 8 is a view of an upper corner of the first embodiment, showing details related to the control system.

FIG. 8 is a view showing a corner of the first embodiment, including one end of the headrail 80. The upper end of the tilt adjustment wand 71 is connected through a universal joint 86 to the automation components mounted in the headrail. A set of dry cell batteries 82 provides electric power to a microcontroller circuit board 81. The circuit board provides power and control signals to a servomotor 83. The servomotor output shaft is simply coupled to the abutting end of the ladder string drum rotor 70. The antenna assembly 85 is attached below the headrail channel, slightly out of range of the nearest swept edge of the topmost slat.

Figure 9:
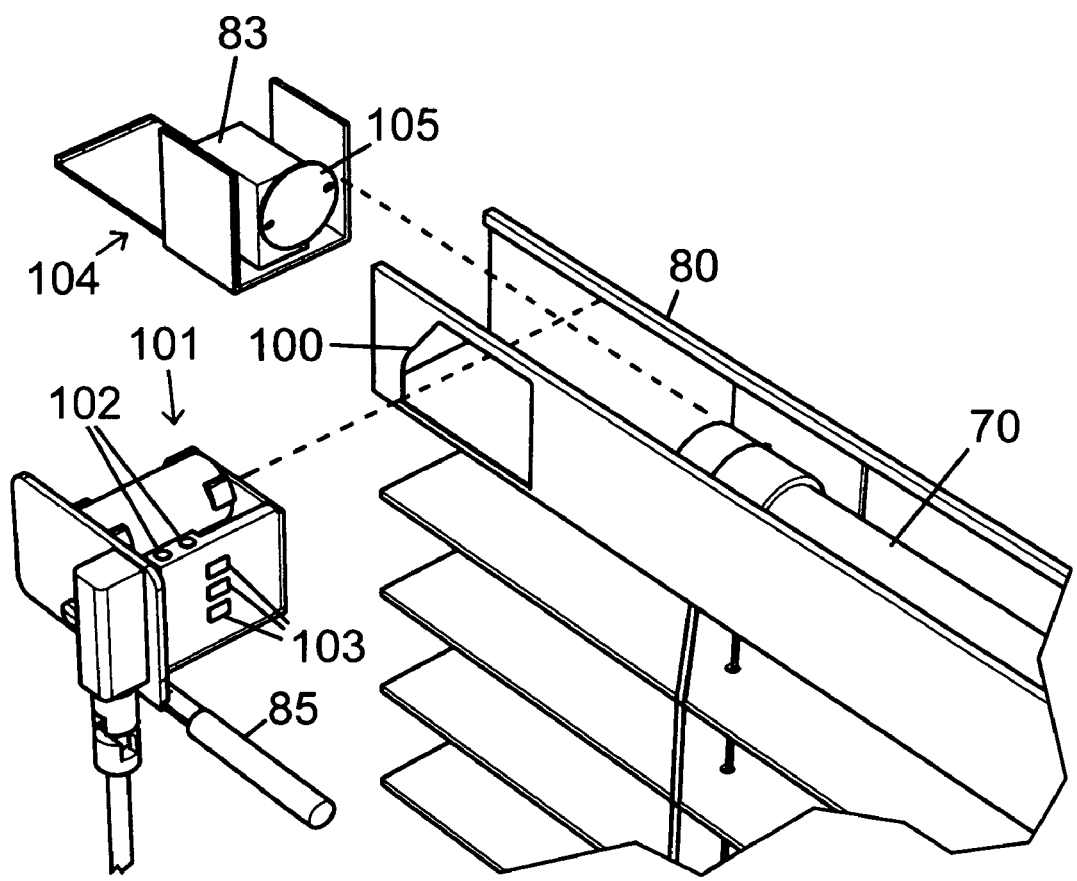
FIG. 9 is an exploded view of an upper corner of the first embodiment, showing details of modular components.

FIG. 9 is an exploded view showing modular structure and assembly of the automation components. The headrail 80 is a prismatic channel of a conventional type, having upper edges that fold into the channel for secure fit of slide-in components. The drive motor module 104 is a slide-in component which includes a platform on which the servomotor 83 is mounted. This view of the drive motor module also shows the coupling 105 attached to the shaft of the servomotor, which when inserted into proper position in the headrail engages the ladder string drum rotor 70.

Also in FIG. 9, a cut-out 100 is shown in the front side of the headrail, which allows for the insertion of a control module 101. The control module is a removable unit designed for easy battery maintenance, as well as easy access to the installation code pushbuttons 102 when the module is removed. The installation code buttons are small momentary-type pushbuttons, which are recessed slightly with respect to their surrounding bezel in order to avoid unintentional button pushes. A set of terminal pads 103 on the control module are adjacent to the servomotor 83 when fully assembled, providing electrical connection to conventional spring contacts (not shown) on the adjacent side of the servomotor. The servomotor 83 should be sized appropriately for the dimensions and type of blinds to be operated, but in any case, high reluctance torque and magnetic cogging are desirable attributes, because a significant amount of shaft torque may be required to hold the set of blinds in position when the servomotor is idle.

Figure 10:
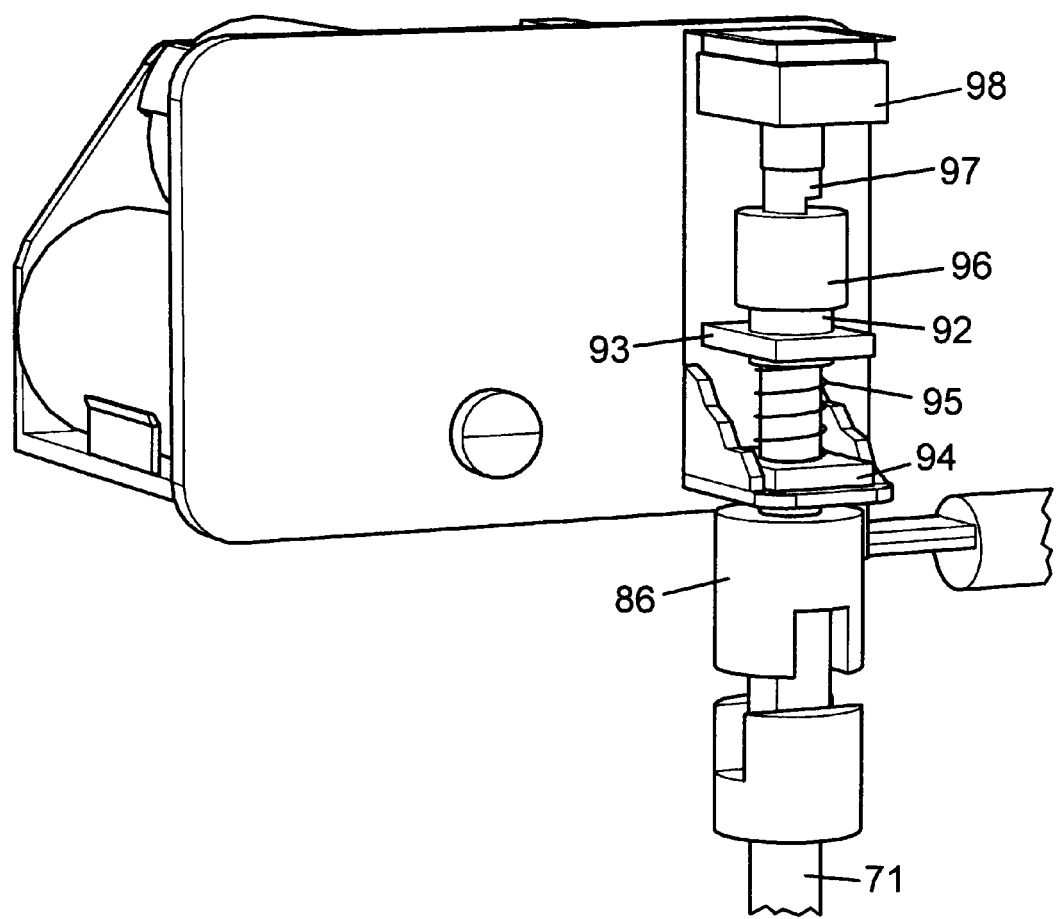
FIG. 10 is a view of a control module, a component of the first embodiment, showing details of the user input electromechanical subcomponents.

FIG. 10 is a view of the control module 101, showing internal electromechanical details. The adjustment shaft 92 is constrained axially by an upper guide 93 and a lower guide 94. The guides allow smooth rotation of the adjustment shaft, as well as a small amount of axial translation. The lower end of the adjustment shaft 92 is connected to the upper end of the universal joint 86. The adjustment shaft has three segments of increasing outside diameters. The smallest diameter segment passes through the lower guide. An intermediate diameter segment passes through the upper guide 93. The largest diameter segment of the adjustment shaft incorporates an annular coupling 96 that mates to a D-type shaft 97 of a rotary quadrature encoder 98. The rotary quadrature encoder 98 is of a conventional, non-optical, type incorporating a momentary contact pushbutton switch. For example, a model EN12-HS22AF20, as manufactured by BI Technologies of Fullerton, Calif. could be used. The body of the encoder is fixed to the structure of the control module 101. A coil spring 95 applies a biasing force upward upon the intermediate diameter segment of the adjustment shaft, the base of the spring resting upon the lower guide 94. The spring force of the coil spring is such that normally the adjustment shaft is pressed upward with sufficient force that the pushbutton internal to the rotary quadrature encoder 98 is depressed. Only when the human operator pulls downward upon the tilt adjustment wand 71 is the biasing spring compressed sufficiently to allow the D-type shaft 97 of the encoder to assume its un-pressed, extended position. The D-type shaft 97 is sufficiently loose within the annular coupling 96 that the upper guide 93 relieves the encoder itself from receiving downward force applied by the human operator that may be in excess of the amount needed to un-press the encoder shaft.

The microcontroller circuit board 81 comprises software which executes continuously while power remains supplied to it. The software defines a set of registers that are used during installation and normal operation of the automated system. These registers store data including the latitude and longitude (as input via the installation code), a position setpoint for the servo control of the adjustable covering, the ordinal date, the local solar time, a timetable of daylight position values that have been logged through the use of the Learn command, thus becoming rules, and user-selectable position values for use before sunrise and after sunset.

Figure 11:
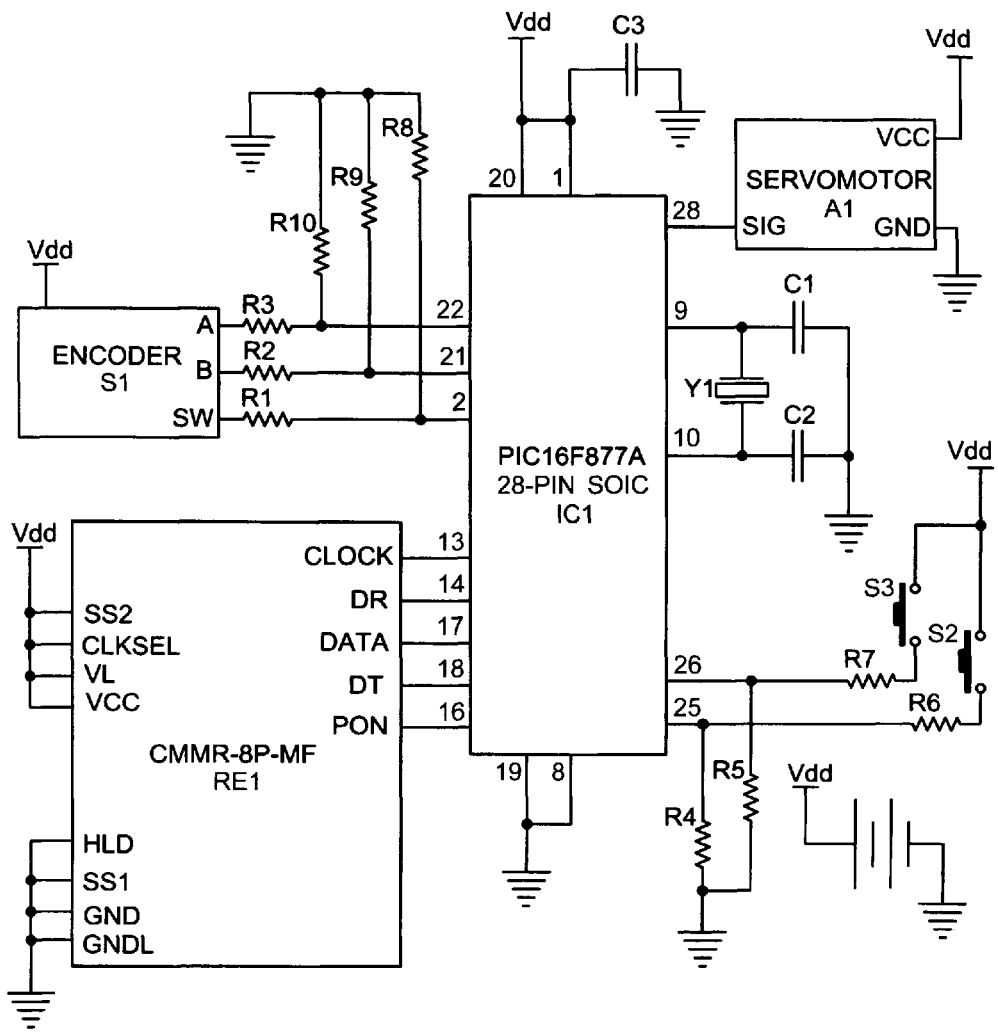
FIG. 11 is a schematic of the first embodiment of the invention.

The circuit diagram of the first embodiment as depicted in FIG. 11 includes microcontroller IC1 as well as input/output devices. Microcontroller IC1 is a PIC16F877A as described above, in a 28-pin SOIC package for pin number reference. Crystal Y1, along with capacitors C1 and C2 provides for a reliable system clock input to IC1, as an included electronic timing means.

The CMMR-8P-MF circuit module RE1 as described above (including receiver/demodulator and antenna) receives CLOCK, DT, and PON signals from IC1 pins 13, 17, and 16, which are configured as microcontroller outputs RC2, RC6 and RC5 respectively. Whenever a time-and-date update is needed, PON is set low to enable RE1, and after a time delay of approximately 500 ms, a series of clock pulses at 4096 Hz is provided to CLOCK. Signal DT is provided a series of 64 clock pulses at approximately 10 kHz, beginning when the time-and-date message is known to be ready. Readiness of the message is indicated to IC1 by signal DR of RE1, read at pin 14, configured as microcontroller input RC3. Each of the DT clock pulses triggers one bit of message data provided as signal DATA of RE1, read at pin 17, configured as microcontroller input RC6. The SS1 and SS2 signals into RE1 are set low and high, respectively, in order to configure the device to receive and demodulate the WWVB signal according to the specified protocol. The CLKSEL signal is set high to select the 4096 Hz clocking mode of operation. PON is set high whenever the time-and-date update sequence is not active, for low power consumption.

Pushbutton switches S2 and S3 are polled by IC1 as the installation code pushbuttons as described above, through pins 25 and 26, configured as microcontroller inputs RB4 and RB5 respectively. The microprocessor can thus sense when both pushbuttons are pressed simultaneously, signaling that an installation code is to be input. The 13-bit binary code (representing geographic location) that follows uses S3 as logic zero and S2 as logic one.

Encoder S1 as described above has quadrature-type rotary outputs A and B polled by IC1 through pins 21 and 22, configured as microcontroller inputs RB0 and RB1 respectively. In addition, the integral axial switch output SW of S1 is polled by IC1, through pin 2, configured as microcontroller input RA0. Thus the signals from S1 together provide the user inputs to increase/decrease an adjustable attribute, as well as provide for the input of a Learn command.

Servomotor A1 as described above has one digital input, SIG, to which pulses of variable duration are provided through IC1 pin 28, which is configured as microcontroller output RB7. Thus, through software control, a digitally proportional signal from IC1 can reposition the output rotor of A1 whenever determined necessary.

Operation: Initialization of the First Embodiment

In a typical installation, the headrail of the automated window covering is mounted in the same manner as a conventional venetian blind headrail such as with a latchable bracket holding each end of the headrail. Batteries are installed in the control module 101, resulting in a power-up reset of the microcontroller and start of software execution. The steps that follow may be referred to as an initialization procedure or sub-method. The installer presses both of the installation code pushbuttons 102 simultaneously. This can be done a) while the control module is removed from the headrail, or b) while the control module is installed in the headrail, if the headrail has not yet been installed at the top of the window opening. The software detects that both buttons are being pressed at the same time, and reacts by executing an installation code input routine. In this routine, the software monitors the installation code buttons for the input of a binary code.

The installation code may correspond to a latitude and longitude within a designed range of use in North America.

For example, tables may be provided to the installer to convert the latitude to a six-bit code, and to convert the longitude to a seven-bit code, to be combined as a 13-bit installation code. When the installation code bits have been fully input by the installer, the code is stored in non-volatile memory within the microcontroller. Typically, input of the installation code will need to be done only once over the service life of the automated window covering unit. Exceptions to this are if the unit is moved to a different geographic location or if the code has been entered incorrectly. If an incorrect code is input, the microcontroller will estimate sunrise and sunset times with respect to a misrepresented local celestial solar position. After the installation code has been entered, an initialization of registers is performed, including the zeroing of all elements in the position timetable. The initialization procedure is then followed by routine operation, beginning with the acquisition of the ordinal date and UTC (or GMT) time through the use of the radio receiver/demodulator 14. The installer should be informed that depending on antenna orientation, signal strength and other factors, the broadcast data elapsed time of day and elapsed time of year may require from one minute to one day to initially be received and put into use. The amount of time required to receive a proper time message depends upon many factors such as distance from the transmission station 11, orientation of the window, solar and meteorological considerations, orientation of the antenna unit, elevation and type of nearby terrain, etc. The variability of time required may be similar to the variability of time required for wall clocks which receive WWVB broadcasts for setting of their clock displays.

Operation: User Interaction with the First Embodiment

A building occupant who is familiar with conventional venetian blinds, but is who not familiar with, or not interested in automation features, can adjust the blinds of the first embodiment without any instruction whatsoever, using the familiar tilt control wand for slat angle, or using the lift adjustment control to raise or lower the blinds. An occupant who prefers that the blinds would make similar slat angle adjustments automatically in the future should be informed of the following: 1. The solar year is broken into 10 segments for the purpose of automatic control. 2. The daylight portion of the solar day is broken into hour-long day-segments for the purpose of automatic control. 3. Pulling down on the tilt control wand interactively logs the current or contemporaneous slat angle setting into a position timetable for the current day-segment, referenced to the current year-segment. The presence of the setting in the timetable constitutes a rule that the setting must be automatically recalled when the same combination of day-segment and year-segment recur. 4. There is a Pre-Dawn position setting, active between midnight and sunrise, which only changes when modified by user command. Likewise, there is a Post-Dusk position setting, active between sunset and midnight which only changes when modified by user command. Thus there is a distinction between daylight intervals and non-daylight intervals in terms of time resolution and dependency upon time of year.

The calendar scheduling capability of the first embodiment is accomplished using a two-dimensional timetable of position values maintained in non-volatile memory. FIG. 6D is a view of the timetable structure. The solar year is divided into 10 year-segments, shown as columns. The range of ordinal dates pertinent to each year-segment, or YSEG for short, is shown in the top line. It may be noted that each YSEG is assigned a duration of approximately a month, except YSEG 0 and YSEG 5, which have about twice that duration. The YSEG boundaries are chosen so that the winter and summer solstices (around which times day lengths change most slowly) are approximately in the middle of YSEGs 0 and 5, respectively. FIG. 6D depicts 16 fixed-length day-segments, or DSEGs for short, each one hour in duration, designated with letters A through P. The time span covered by the set of DSEGs is intended to approximate the entire possible range of local solar time (abbreviated LST) during which sunrise and sunset may occur at any time of year, within any location within the designed geographic area of intended use. Thus in the first embodiment, DSEG A begins at 4:00 am LST, and DSEG P ends at 8:00 pm LST.

Figure 6A:
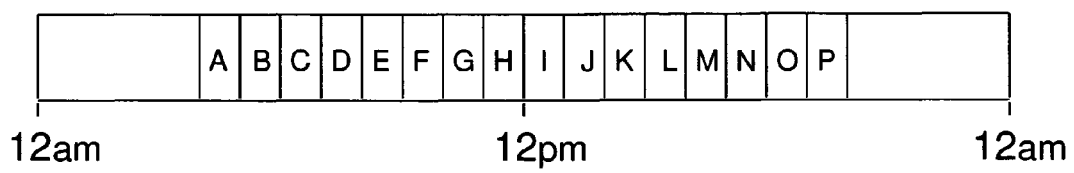
FIG. 6A is a timeline showing the division of a solar day into fixed segments as in the first embodiment.
Figure 6B:
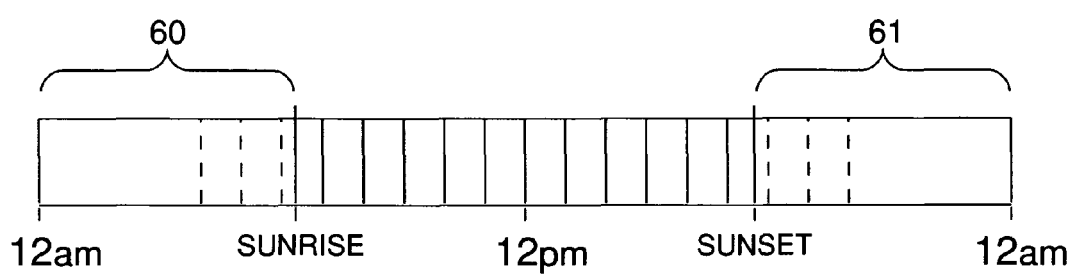
FIG. 6B is a timeline showing the superposition of sunrise and sunset times upon predetermined day segments.

FIG. 6A depicts a timeline for one solar day, in which the fixed-length DSEGs are labeled A through P. Because the DSEGs boundaries are based on local solar time, transit time for the sun should generally coincide with the transition from DSEG H to DSEG I. FIG. 6B depicts the Pre-Dawn day-segment 60 and the Post-Dusk day-segment 61 superimposed on the timeline of fixed-length day-segments. In operation, the Pre-Dawn and Post-Dusk day-segments supersede whatever DSEGs or portions thereof that they overlap on any particular day. Thus the stored setpoint positions of the DSEGs are normally used only between sunrise and sunset.

The timetable in FIG. 6D includes some stored position data and symbols to illustrate an example of use of the first embodiment. The range of actual setpoint position value in the first embodiment is 1 to 31, where a value of 1 corresponds to the interior edges of the slats in their maximum raised position, and a value of 31 corresponds to the exterior edges of the slats in their maximum raised position. A value of zero in the table indicates that no setting has been made to an element subsequent to the performance of an initialization operation. All of the elements in FIG. 6D have the default position value of zero except those that have been altered during the course of the example as described below. Star symbols mark elements altered by operator Learn commands. The arrow symbol is used to indicate an element into which the stored position value of the DSEG in the previous YSEG is copied at the time of a DSEG transition.

To begin an example of the use of the calendar scheduling capability, assume that the automated blinds have been installed in a westward-facing window on the ordinal date of 30, within YSEG 1. The installation and initialization having been completed, the human operator makes a series of slat angle adjustments at various times on ordinal date 30 during daylight hours. The operator does not use the Learn command, and therefore no rules are communicated, and thus no values are stored in the timetable. The blinds do, however, adjust to a night-time position at sunset, by automatically reverting to the Post-Dusk position setting. In the following days, the operator continues to adjust the blinds on an ad hoc basis. The blinds automatically close at sunset, albeit at later times due to the lengthening days. Thus the invention is shown to have a useful automation function, even when programming commands are not used. The invention is also shown to provide for manual user adjustment by conventional actions typical of non-automated window coverings.

To continue the example, four weeks later, on the ordinal date of 58, the operator decides to teach the blinds to adjust to a particular position automatically in the morning. At for instance, 6:57 LST, the operator adjusts the slats to a somewhat horizontal angle, corresponding to a setpoint value of 14, and then pulls downward on the tilt adjustment wand. This places a value of 14 into the timetable element for DSEG C of YSEG 2, to be treated as a rule for future repetitions of the DSEG C within YSEG 2. A shorthand method is used to flag YSEG 2 at large as having been altered, by removing the default value of DSEG A, changing it to 1. At, for example, 4:13 pm LST, there is too much direct sunlight entering to suit the operator, and the operator adjusts the blinds and logs a setpoint of 7 into the timetable for DSEG M. The slats remain at a position value of 7 until the moment of predicted sunset, then revert to the Post-Dusk setting. On day 59 and the days that follow, the blinds adjust to position value 14 at 6:00 am LST, then adjust to position value 7 at 4:00 pm LST, and then revert to the Post-Dusk setting at sunset. Thus it is shown that programming the automated window covering is accomplished without the need for viewing any type of display, nor using a keypad, nor reading any words or numbers.

On day 80, a YSEG boundary is crossed, and YSEG 3 begins. For YSEG 3, the software determines that the position values for all DSEGs are the default value, and as a result, all of the position values are copied from the previous YSEG. In the table, three elements in YSEG 3, marked in FIG. 6D with arrows, are thus set to 1, 14, and 7, as in YSEG 2. On day 111, a YSEG boundary is crossed, and position settings are again copied from the previous YSEG. On day 134, the operator desires to close the blinds entirely in the early afternoon due to excessive summertime heat gain. At for instance 1:22 LST, the operator sets the slats to position 1 and then uses the Learn command, which sets the position value of 1 into DSEG J of YSEG 4, marked with a star symbol in FIG. 6D. At 4:00 pm LST, the blinds re-adjust to position value 7, after which the operator again sets the slats to position 1 and issues the Learn command, which sets the position value of 1 into DSEG M of YSEG 4, also marked with a star symbol in FIG. 6D. In the remaining days of YSEG 4, and throughout YSEGs 5 and 6, the blinds close automatically at 1:00 pm LST, assuming that no other adjustments are made. In YSEG 7, for example on day 256, assuming that after summer the operator is no longer concerned about excessive afternoon heat gain, the operator uses the Learn command, at for example 1:45 pm LST, to set DSEG J to position value 14 and, at for example 4:26, to set DSEG M to position value 7. Assuming no other Learn commands are issued, the DSEG settings of YSEG 7 are eventually copied for YSEGs 8, 9, and 0.

When YSEG 1 is entered in the year following installation, DSEG settings of YSEG 0 are copied for YSEG 1 (changes in YSEG 1 not shown in FIG. 6D). In YSEG 2 and succeeding YSEGs, because previous years settings have been retained, they are available and are reused. Thus the invention periodically reverts to user settings from a previous year, even after having been manually adjusted and reprogrammed at various times in the intervening days and seasons.

In case multiple automated coverings of similar type are installed in multiple windows of the same building, the same YSEG and DSEG boundaries apply to all of them. Thus if one covering is programmed for a adjustment at 4:04 pm LST and another covering is programmed for an adjustment at 4:54 pm LST, on the next day of the same YSEG, both coverings will be seen adjusting at the same moment, that is, at 4:00 pm LST. Thus, precise synchronization is achieved a) by virtue of the granularity of the DSEG boundaries and b) by virtue of each unit receiving broadcasts from the same time standard, yet no central control system is needed on site.

Software Design in the First Embodiment

After the installation and initialization tasks are completed as described above, the software executes in the normal, high-level loop as illustrated in FIG. 2. This loop begins with a software step 20, in which any ongoing user inputs from the tilt adjustment wand 71 are detected. These user inputs consist of 1) rotation of the wand either a) clockwise, b) counter-clockwise, or 2) momentary pulling of the wand downwards. The loop continues with a software step 21, in which any change in position setpoint of the venetian blind slat angle, which is the adjustable attribute, is processed and a signal is sent to the servomotor as needed to adjust the tilt angle of the slats. The execution continues with the execution of step 22, in which any needed update to the internally registered LST is made.

When step 21 is executed, a signal is only sent to the servomotor if the position setpoint has been updated since the previous execution of step 21. If it is determined that the setpoint has indeed changed, then a digitally-proportional signal encoding the position is transmitted repeatedly, approximately 30 times, at intervals of approximately 20 milliseconds. Thus the time span of the total train of servomotor pulses is approximately 600 milliseconds. The purpose of limiting the time span of pulses is to activate the servomotor for a sufficient duration to properly adjust the position, yet allow the servomotor to return to its inactive state if the rotor or any driven component is mechanically blocked from the full range of movement commanded. Thus, the motor is protected from overheating, burnout, and excessive power use.

The user interface input processing of Step 20 may be further described in the lower-level steps shown in FIG. 3. User interface input processing begins with step 30, in which the rotary encoder input is read. In step 31, a determination is made whether the encoder input has changed sufficiently as to require a position setpoint change to the adjustable attribute, in this case slat tilt angle. If yes, Step 32 is executed in which the position setpoint is adjusted in the magnitude and sign as necessitated by the encoder input. If no, execution skips directly to Step 33, in which the encoder pushbutton is polled to determine if the tilt control wand is being pulled downwards, signifying issuance of the Learn command by the operator. If the Learn command is being issued, step 34 is performed, in which a determination is made if the stored mode state of the system is Manual. If the mode is not Manual, then the high level step 20 is completed. On the other hand, if step 34 determines that the mode state is Manual, then step 35 is performed, in which the current or present position setpoint value is stored in the non-volatile memory table indexed to the current, that is to say active, day segment, within the current, active year segment. In case that the Learn command was issued between midnight and sunrise, the present position is stored as the Pre-Dawn position setting, and similarly, if the command was issued between sunset and midnight, the present position is stored as the Post-Dusk position setting. The execution of step 35 completes the high-level step 20. High-level step 20 is also completed if step 33 determines that no Learn command was input.

The time update processing of Step 22 can be further described in the lower-level steps shown in FIG. 4. Starting with step 40, in which the amount of elapsed time subsequent to the most recent radio time broadcast was received is compared to some predetermined interval, such as one-fourth of one day. The predetermined interval may be a fraction of a day, a whole day, or even a value larger than one day, based on considerations of the accuracy of the included timekeeping device, desired accuracy of the adjustment schedule or timetable, and desired low power performance of the system. If step 40 determines that the predetermined interval has been exceeded, then step 41 is executed, in which the time standard receiving circuit is activated, and the microcontroller uses the proper protocol to receive data and status signals. Step 42 then determines whether any message was received, and whether any message received is valid according the expected format and range of values. If no valid message was received during the attempt, then step 43B is executed next, which deactivates the time standard receiving circuit to conserve power, and the time update processing as per high-level Step 22 is completed. On the other hand, if Step 42 determines that a valid message was received, then step 43A is executed next, which deactivates the time standard receiving circuit to conserve power, after which a Step 44 is executed, in which the time standard message is immediately used to update the registers keeping the elapsed time of year and LST of day. If step 40 determines that the predetermined interval has not been exceeded, then step 46 is executed, in which the registers keeping the elapsed time of year and LST of day are updated as needed by function of the included timekeeping circuit. After Step 44 is executed, Step 45 is executed, in which the timetable is accessed to retrieve the position value stored for the current or contemporaneous day-segment, referencing the current year-segment. Step 45 is similarly executed at the completion of Step 46. Thus the software defines both a daily cyclical structure and a yearly cyclical structure.

Step 21 can be further described in the lower-level steps shown in FIG. 5. Starting with step 50, in which the registered time and ordinal date are compared to year-segment boundaries to determine if a new year-segment has been entered, or if a new solar day has begun since the most recent execution of this step. If either of the conditions is true then step 51 is executed, in which the position setpoint is changed to the value stored for use between midnight and sunrise. After step 51 is executed, then step 53 is performed, in which the set of position values stored for the current day-segment are compared to the default value to which all day-segments were initially set. If step 53 determines that all values stored for the current day-segment are still the default value, then step 56 is executed, in which the set of position values for the previous day segment are copied and stored for use in the current day segment, completing processing of high-level step 45. On the other hand, if step 53 determines that one or more entries stored for the current day-segment are no longer the default value, then processing of high-level step 45 is complete. If step 50 determines that no new year-segment has been entered, nor no new solar day has begun, then step 52 is executed, in which registered time is compared to the predicted sunrise time, and also compared the set of day-segment boundaries to determine if sunrise has occurred, or if a new day-segment has been entered since the most recent execution of this step. The predicted sunrise time is estimated by interpolation of predetermined tabular values at various latitudes and longitudes, given the registered latitude and longitude as previously determined. If either of the conditions of step 52 is true then step 55 is executed, in which the position value stored for the current day-segment is compared to the default value. If the default value remains, then no position setpoint change is made, and processing of high-level step 45 is complete. On the other hand, if the value stored for the current day-segment has a value other than the default value, then step 58 is executed, in which the position setpoint is changed to the stored value for the day-segment, completing processing of high-level step 45. If, at step 52, it is determined that no sunrise has occurred, nor no new day-segment has been entered since the most recent execution of that step, then step 54 is executed, in which registered time is compared to the predicted sunset time (also estimated by use of tabular values). If step 54 determines that sunset has not occurred since the most recent execution of step 45, then processing of high-level step 45 is complete. Otherwise, if step 54 determines that sunset has indeed occurred since the most recent execution of step 45, then step 57 is executed, in which the position setpoint is changed to the stored value for use between sunset and midnight, completing processing of high-level step 45.

While the flowcharts of FIG. 2 through 5 show the automation of a covering for an architectural opening broken down into specific steps occurring in a specific order, any number of similar steps may be used in the same or alternate order in an embodiment designed for a particular automation application. Further, the processing of various steps may be distributed throughout the system hardware, incorporating such techniques well known in the art as time division multiplexing, polling, distributed processing, multi-level interrupt-driven processing and the like, comprising additional operational and wait steps not included in the above flowcharts.

Implications of Use of Time Standard Signals

Whereas FIG. 1 depicts the invention in a specific manner with a single antenna 13, any number of antennae oriented in any manner, including antennae which are movable, including antennae which are on motorized apparatus, including motorized apparatus which are moved by the same motor as is used for adjustment of the adjustable covering, may serve the purpose of the antenna in the invention. In addition, whereas FIG. 1 depicts the invention receiving a time standard radio broadcast from a single transmitter, in practice the invention may be designed with the capability to receive signals from any of a plurality of transmitters, including transmitters with variations in radio frequency, encoding protocol, etc. It may be of benefit to planning for marketing of the some embodiments that specific production models can be designed to function only within specific geographic limits, whether through pre-selection of the set of transmitters which are usable, or through limitation of the ranges of latitude and longitude which are user-selectable at installation.

Implications of Receiver/Demodulator Duty Cycle

Whereas the first embodiment employs a receiver/demodulator which is only activated at intervals in order to periodically synchronize timekeeping features of the apparatus, in an alternate embodiment, the receiver/demodulator is activated continuously. In addition, in this alternate embodiment the antenna and receiver/demodulator are designed and selected for high reliability of broadcast reception within the geographical area of intended use. Every valid time and date message received is immediately registered, but no updating of time or date is performed aside from that. Thus referring to the schematic in FIG. 11, the PON signal would be set low continuously. Also, referring to FIG. 4, the process is simplified by the elimination of decision steps 40 and 42, since what is needed is to unconditionally receive and register the time and date. A trade-off to be considered with this alternate embodiment is that while the software may be simplified, and the need for high-precision timekeeping components may be eliminated, continuous operation of the receiver/demodulator may result in higher electric power consumption.

Use of Alternate Types of Broadcast Signal

Whereas the first embodiment employs a receiver/demodulator which is designed for encoded low-frequency amplitude-modulated (AM) time standard broadcasts, in an alternate embodiment, the time standard is a microwave frequency signal from a celestial source such as one or more global positioning system satellites or a short range, ground based cellular-telephone communication network, using conventional or alternate modulation methods.

Auxiliary Uses for Time Data

Whereas in the first embodiment, the time standard, the radio receiver/demodulator 14 is used solely for the purpose of providing celestial solar referencing for automation of venetian blinds, in an alternate embodiment, the accurate timing data as received may be retransmitted for master control of other devices in close proximity. For example, an infrared light-emitting diode integrated into the control module 101 may periodically send an encoded signal out into the room where the automated covering is installed. A specially-designed digital alarm clock may have an infrared sensor which receives the encoded signal and sets the internal registers for displayed time and date accordingly. Such a system may not only save the expense of an additional time-standard-receiving circuit within an alarm clock, it also may aid in troubleshooting for time-standard reception issues, such as radio interference and direction adjustment of the antenna. In another alternate embodiment, an interface device with an infrared sensor receives the infrared encoded signal and makes the precise timing information available for updating the real-time clock on a general purpose computer.

Use of Multiple Learn Commands

Whereas the first embodiment is based on a design philosophy of presenting a very simple, clean user interface, wherein only one Learn command is added to the familiar venetian blind user interface, in an alternate embodiment there are multiple Learn commands made available to the operator in order to indicate more specific preferences. When weather is cloudy, the occupants may prefer different adjustment settings, considering the time-of-day and time-of year, than when weather is sunny. By incorporating a conventional cloudiness sensing method, for example spectral analysis of daylight, the control system can select between two parallel calendar/schedule tables, one for cloudy weather and one for sunny. When the user programs a new adjustment setting, separate user inputs for Learn-Cloudy or Learn-Sunny can be selected, telling the control system to log the current position into the respective table. As day-segments and year-segments elapse, the cloudiness-sensing function selects whether the sunny-weather or the cloudy-weather table is used for recall of the adjustment settings for upcoming day-segments. Variation of adjustment based on cloudiness is not limited in practice to selecting between two tables. In actuality, preferences may be internally represented as a set of coefficients of continuous functional relationships between time, date, sensed cloudiness and adjustment setting. Furthermore, the example of cloudiness is simply one example of occupant-independent inputs to the automatic control function of the invention. Thus, in still another embodiment, sensed exterior temperature or sensed heat flux across a window may be used as an input to the control function. As an alternative to input variables sensed at run-time, a functional relationship correlated to seasonal climate patterns for the approximate geographic location may be pre-programmed into the invention, for example to shut thermal-insulating shades on the hottest afternoons of the year, based on a regional weather database.

Incorporating a Real Time Clock as an Additional Feature

Whereas in the first embodiment, boundaries between day segments are determined on the basis of local solar time, in an alternate embodiment, the radio time standard messages are used to initialize a real-time clock for a local time zone. The real time clock can be used with additional programming settings to provide additional time-based automation instructions. For instance, if a window covering is used in the windows of a shop which opens at 10:00 local time, the user could input an instruction to always override other scheduled settings if needed to remain in a closed position until 10:00. Referring to FIG. 2, the option to input such instructions to override the day segment schedule could be added to Step 20, and the processing of such instructions could be added to Step 22.

Alternate Units and Calibrations

Whereas in the first embodiment, the broadcast time standard is described as being UTC time, and time is internally represented as local solar time (LST) for conceptual simplicity, any temporal calibration scheme that can be referenced to celestial positions of the sun could be used to represent time in an alternate embodiment. While hours, and minutes and have been described as units of time, any arbitrary time units could alternately be used internally and externally to the invention.

Use of Selectable Time Offsets

Figure 6C:
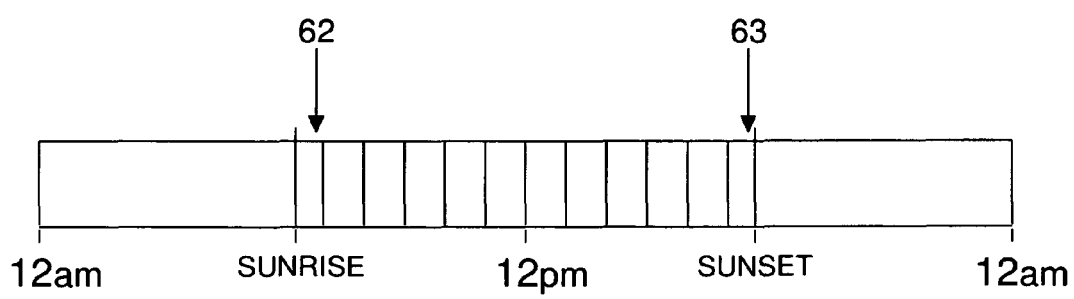
FIG. 6C is a timeline showing the application of sunrise and sunset offsets.

Whereas in the first embodiment, a position timetable transition always occurs at the moment of predicted local sunrise, in an alternate embodiment a time offset can be pre-selected and stored in the microcontroller which can be used to hasten or to delay the transition at the human operator's preference, for example to open the window covering twenty minutes after predicted sunrise time. Similarly, an offset of, for example, minus ten minutes may be pre-selected by the operator and added to the time of sunset. FIG. 6C depicts such offsets applied to a timeline as used previously in FIG. 6B.

Implications of Alternate Scheduling Schema

Figure 6F:
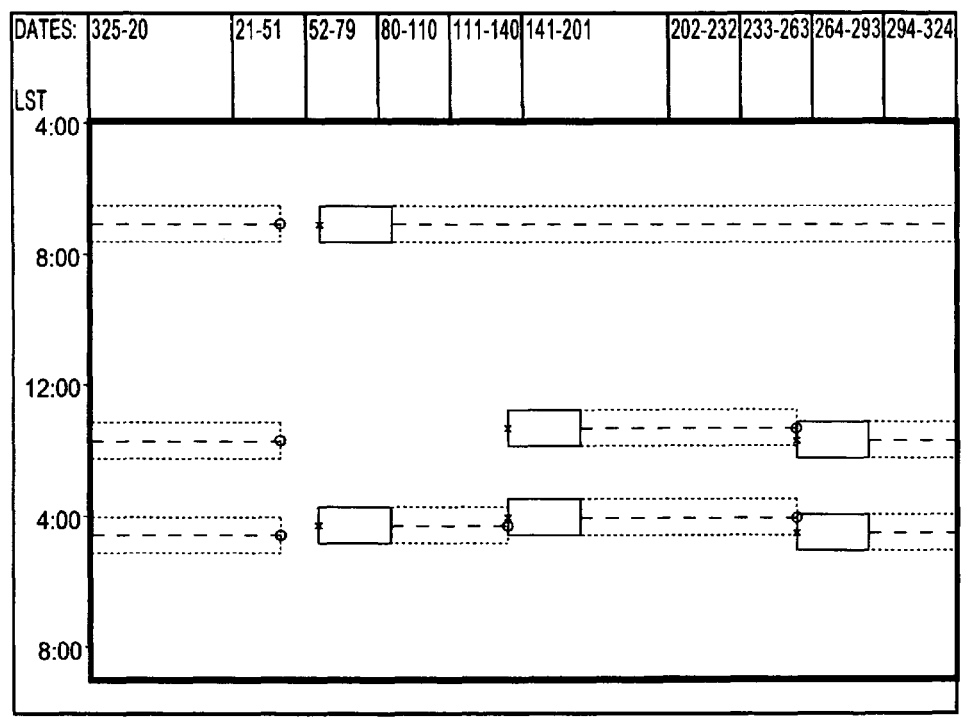
FIG. 6F is a timetable implemented within an alternate embodiment depicting the internal representation of a schedule created in an example of operation.

Whereas the calendar scheduling capability of the first embodiment is accomplished using a timetable of position values as depicted in FIG. 6D, in an alternate embodiment, the Learn commands are logged in a list of instructions as depicted in FIG. 6E. Such a list could be used to represent the same actions as are discussed above in the example of operation of the first embodiment above. Instead of pre-allocating memory elements to a structure of day-segments and year-segments to cover the entire year, the control system allocates memory sufficient to store a reasonable number n elements of a list of commands depicted in lines numbered 1 through n in FIG. 6E. By default, an initial duration of thirty days is assigned at the time that a command is added to the list. An algorithm is used to determine when there is a need to clear an instruction from the table as well, to prevent clutter. For example, any time a new instruction is added to the list, a comparison can be made to all of the existing instructions, erasing any that interfere with an envelope surrounding the start time if they also are within thirty days of the start date. The envelope around the start time may be defined as within 30 minutes bidirectional to the new instruction. In addition, existing instructions that interfere with the start time envelope but begin before the start date are shortened in duration to the extent that they may overlap the start date of the new instruction. With each passing day, the duration of each active instruction is extended by one day, providing its forward envelope does not interfere with a future instruction. FIG. 6F provides an illustration of the same sequence of operator instructions at the same times and dates used above in the example of the operation of the first embodiment. The time envelope extended rightward to the initial duration of each instruction appears as a rectangle touching the time of the instruction itself, which is shown with an X. Dotted lines show the eventual extensions of the duration of the time envelope, limited by interferences with other instructions. Dashed lines show the eventual extensions of the effective duration of the instruction. The ultimate extent of the duration is shown with a circle symbol. FIG. 6F depicts the updating of the list through an ordinal date of 7, beginning the second year of operation. The date ranges at the top of the figure are for purposes of comparison to FIG. 6D. It may be noted that although the automated operation of the covering is capable of higher time and date resolution in such an alternate embodiment, the ease of use and conceptual understanding from the operator's point of view may be diminished. Even so, it is shown that in order for the invention to provide useful automation functions, the day segments are not required to be of equal duration, nor must the lengths of the year- or day-segments be predetermined.

In an alternate embodiment, the invention may incorporate a perpetual calendar function to differentiate between days of the week. By receiving a time standard protocol that references the calendar year, a perpetual calendar formula can be used to determine the current day of the week. Learn commands can thus be classified and stored by the day of the week that they were received. In one embodiment, a weekday calendar-schedule may be stored separately and used alternately from a weekend calendar-schedule. This may be advantageous for rooms that are used in ways that vary according to the day of the week.

Automation of Multiple Adjustable Attributes

Whereas in the first embodiment, only one adjustable attribute, slat tilt angle, is automated, in an alternate embodiment, additional adjustable attributes are also automated. For example, for a venetian blind unit, the lift cords may be provided with a motorized take-up reel (not shown), having position feedback sensing means. Data for the lift adjustment can then be stored and recalled in parallel with the position data for the tilt angle adjustment, actuating the take-up reel as necessary. The same Learn command enables the microcontroller to log multiple adjustable attributes in parallel.

Use of Removable Storage Devices and Removable Access Control Devices

Whereas in the first embodiment, the user is presented with a simple, user interface having a minimum of hand operated controls, an alternate embodiment includes a removable data storage device interface, for example a secure digital (SD) flash memory card. Removal of data storage device allows for a more advanced user interface for display, programming, modeling, analysis, duplication, and/or backup of the adjustable attribute timetable, installation settings and/or other instructions on a general purpose computer, running for example a local or internet-based software application designed for administration of automated window coverings. One example in which such an externally programmed, removable memory system may be especially useful is that of a building in which the window coverings are not intended to be controlled by typical occupants, as in cases in which such coverings are simply out of reach. In such cases where hands-on control by typical occupants is not intended, user interfaces such as tilt adjustment wands, operating cords, or pull wands may be left out of the apparatus entirely, reducing complexity and cost.

Just as there are cases in which a window covering is essentially out of reach, there are cases in which the window covering is within reach, yet the operator prefers not to allow visitors to modify the schedule and calendar of adjustments. To serve this need, in an alternate embodiment, a key or the like provides access to the Learn command input. A conventional keyswitch is added to control the input signal to the microcontroller 15. Thus, with access switched off, visitors may adjust the blinds in manual mode, but no lasting changes are made to stored data.

Alternate Methods of Incorporating Geographic Location

Whereas in the first embodiment, installation code pushbuttons 102 are used as described above to inform the microcontroller of the approximate latitude and longitude for the installed location, in an alternate embodiment, the geographic location coordinates are preprogrammed as a step in the manufacturing or final assembly process, using shop equipment for example. Thus the cost of pushbuttons is eliminated, and the installer's tasks are simplified. In still another embodiment, the geographic location is input by an electronic interface established with the installed unit, for example, a universal serial bus (USB) or standard infrared data interface to a general-purpose computer system or mobile telephone executing an application for the programming of automated window coverings. In still another embodiment, the geographic location data are received by means of an included Global Positioning System (GPS) receiver. In still another embodiment, the geographic location data are not registered within any internal component, but predetermined celestial data are registered within the unit to provide sunrise and sunset times or other solar celestial position information as a function of the approximate day of the year.

Alternate User Interface Methods and Components

Figure 12:
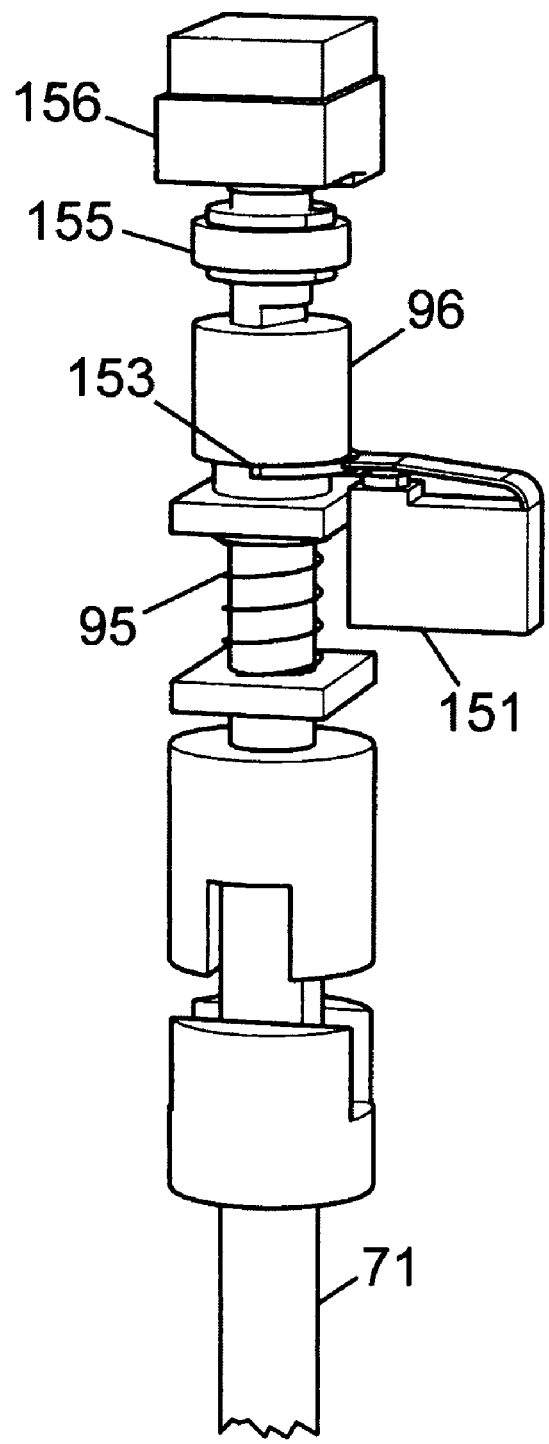
FIG. 12 is a view showing user input components of an alternate embodiment incorporating a slip clutch and a rotary switch.

Whereas in the first embodiment, the shaft from the tilt adjustment wand 71 actuates a rotary quadrature encoder 98, in an alternate embodiment, the shaft from the tilt adjustment wand 71 is coupled with the shaft of a 3-position rotary switch 156 as depicted in FIG. 12. The rotary switch is of the type that has a spring-return to the center position from both its momentary clockwise- and counterclockwise-extreme positions. In addition, a slip clutch 155 is incorporated into the shaft whereby the operator can rotate the shaft through any number of partial or complete revolutions without overtorquing the rotary switch 156 in either direction, while applying sufficient torque to signal a change to the adjustable attribute. The microcontroller software is designed to change the position setpoint by an amount substantially proportional to the duration of time that the switch is held in the operator-signaled extreme position. The Learn command signal to the microcontroller (not shown) is provided by a momentary switch 151, which is coupled to a yoke 153, which slidingly contacts the underside of the widest segment of an annular coupling 96. A coil spring 95 in this alternate embodiment provides the additional force needed to lift the tilt adjustment wand 71 back to its original position after being pulled downward. Similarly to the first embodiment, the D-type shaft extending out of the annular coupling 96 is sufficiently loose that only insignificant axial forces are transmitted to the slip clutch 155.

Implications of Power Source Selection

Whereas in the first embodiment, one or more dry cell batteries 82 may be employed as the electric power source for the automation components of the system, in an alternate embodiment, one or more conventional solar power collection and storage systems as are known in the art is used as the power source for one or more powered components. Such solar power collection and storage systems may incorporate such collection components as photovoltaic cells, as well as such storage components as rechargeable batteries and/or ultracapacitors in order to provided adequate power at times when sunlight itself may be insufficient for operation.

In an alternate embodiment, a conventional switching boost converter is used in conjunction with storage batteries to increase the usable capacity of the batteries themselves. In another alternate embodiment, ultracapacitors are used for reducing the peak current draw from dry cell batteries 82, as is known in the art, to smooth out the duty cycle of the batteries, increasing available capacity of the batteries.

Implications of Covering Adjustment Rate

In an alternate embodiment, the rate of adjustment can be preset to be sufficiently slow that motion-sensing building security systems are not triggered by the routine adjustments of the covering. In the case of battery-powered, motorized coverings, such reduction in adjustment rate can have an additional benefit, smoothing the duty cycle of the batteries, thereby increasing their available capacity.

Use of Alternate Adjustment Methods

Whereas in the first embodiment, a conventional, digitally-proportional controlled servomotor 83 may be used to change the position of the adjustable covering, in an alternate embodiment, a stepper motor is used to adjust the covering. Using a stepper motor as an alternate electromechanical actuation means may provide the benefits of quieter operation, lower power consumption, increased range of motion, and/or greater control over rate of movement. In particular, when the automated covering does not have such designed limits of motion as in the case of venetian blind tilt angle, the total range of motion may depend upon dimensions of the architectural opening that is covered. For example, if a roll-down shade is the adjustable covering, the range of motion may depend upon the height of the covered opening for a particular installation. For such an installation, a design employing a stepper motor, or a gearmotor-position encoder combination is suggested. As is known in the art, a position reference means may be useful when using a stepper motor to adjust a window covering within given limits of motion. Such position reference means may include the proximity switch, the potentiometer, and/or the calibrated mechanical stop.

Whereas in the design of the first embodiment, the motor assembly that is used to position the adjustable covering is selected partly on the basis of its reluctance torque and magnetic cogging tendency, in an alternate embodiment, one or more braking devices may be used to aid in holding the covering in the set position at times when the servo feedback loop is inactive.

Whereas in the first embodiment, a conventional, mechanical movable window covering provides the adjustable attribute for automation, in an alternate embodiment a smart glass unit as described above is controlled by the microcontroller, with transparency or opacity as an adjustable attribute.

Use of a Mechanical Backup System

Figure 13:
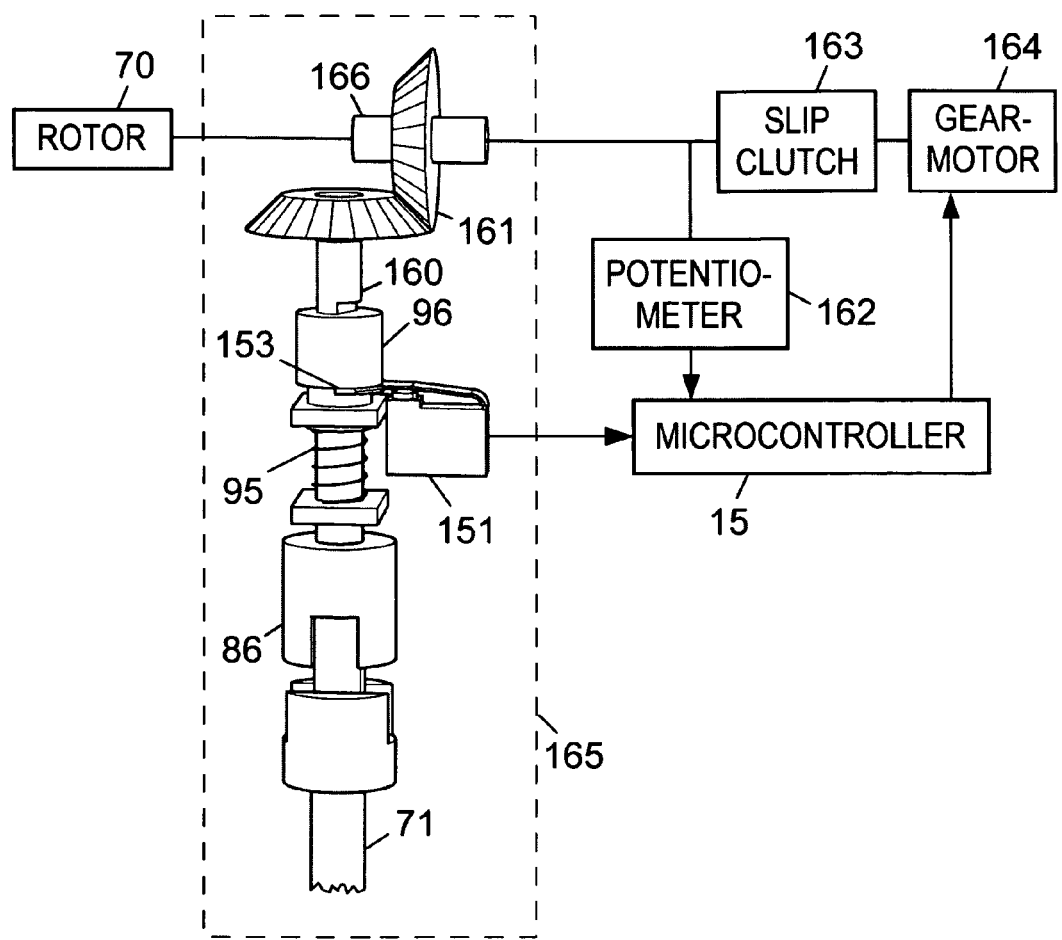
FIG. 13 is a view showing the relationships between components of an alternate embodiment that is mechanically adjustable by manual means when electric power supply is not present.

Whereas in the first embodiment, the only active connection between the hand-actuated adjustment control and the adjustable covering depends upon the function of electrically-powered electronic circuitry, in an alternate embodiment, a mechanical drive train 165 connects the hand-actuated adjustment control to the adjustable covering, whereby manual effort can be used as a backup, to make adjustments in case of electric power supply failure. As depicted in FIG. 13, a tilt adjustment wand 71 is connected through a universal joint 86, to annular coupling 96. A coil spring 95 provides the force needed to lift tilt adjustment wand 71 back to its original position after being pulled downward. The Learn command signal to microcontroller 15 is provided by a momentary switch 151, which is coupled to a yoke 153, which slidingly contacts the underside of the widest segment of annular coupling 96. The upper end of annular coupling 96 is mated to D-type drive shaft 160, which connects to bevel gear set 161. Similarly to the first embodiment, the D-type shaft extending out of annular coupling 96 is sufficiently loose that only insignificant axial forces are transmitted to D-type drive shaft 160. The horizontal-axis rotation of bevel gear set 161 is transmitted through horizontal shaft 166 to ladder string drum rotor 70, and also to potentiometer 162 and slip clutch 163. The opposite end of the slip clutch connects to the output of reversible gearmotor 164. The torque setting of slip clutch 163 is set sufficiently high that when the microcontroller signals the gearmotor to adjust ladder string drum rotor 70, the gearmotor can provide torque to position the rotor as necessary, overcoming friction effects in drive train components. On the other hand, the torque setting of slip clutch 163 is low enough that when the human operator rotates tilt adjustment wand 71 to adjust the blinds, the ladder string drum rotor 70, and the potentiometer can be re-positioned with sufficient ease that a) no component of the drive train is subjected to damage by overtorque nor to significant wear, and b) the geared reluctance torque associated with the gearmotor is not exceeded, that is the gearmotor shaft is not rotated by the externally-applied torque. The microcontroller 15 and radio receiver/demodulator 14, as described above in the first embodiment, are included in this embodiment, but with the addition of motor driver circuit components if needed, based on the specific gearmotor and microcontroller selected for a specific design application. The microcontroller software differs from the software described in the first embodiment in several ways. Firstly, a provision for servo control of the gearmotor 164, based on the signal from potentiometer 162, is included in this embodiment. Whenever step 32 or step 45 of the software is executed as described above, the gearmotor moves the ladder string drum rotor 70 (along with the rest of the mechanical drive train components) to the updated position setpoint by means of a servo loop implemented in the microcontroller. Secondly, step 30 of the software for accepting user input of position updates is altered such that whereas in the first embodiment, a change in the digital output of the rotary quadrature encoder 98 indicates a position signal input, in the alternate embodiment the signal from momentary switch 151 not only constitutes a Learn command but necessitates reading the potentiometer signal to obtain the absolute position at that moment. The potentiometer is also polled at least once per DSEG for a change in position, using an analog-to-digital input channel in the microcontroller.

In normal circumstances, electric power is available to the microcontroller 15, radio receiver/demodulator 14, and related components, and the human operator uses the same user interface actions to adjust the blind angle and issue the Learn command as in the first embodiment. In this case, when a building occupant rotates tilt adjustment wand 71, the rotation is transmitted through the mechanical drive train 165 to ladder string drum rotor 70 adjusting the blind angle. At the same time that the ladder string drum rotor is adjusted, potentiometer 162 is also adjusted. When user adjustment is being made, slip clutch 163 slips as necessary. When the microcontroller polls the signal from the potentiometer, the changed blind position is detected. Automatic adjustments are made by the microcontroller by providing power to the gearmotor in accordance to the servo loop as described above.

In case electric power fails, mechanical drive train 165 still allows the human operator to adjust the blind angle, adjusting the potentiometer 162 as well, although the Learn command does not function, nor can any automatic adjustments take place until power is restored.

Use of a Non-Stationary Automation Apparatus

Figure 14A:
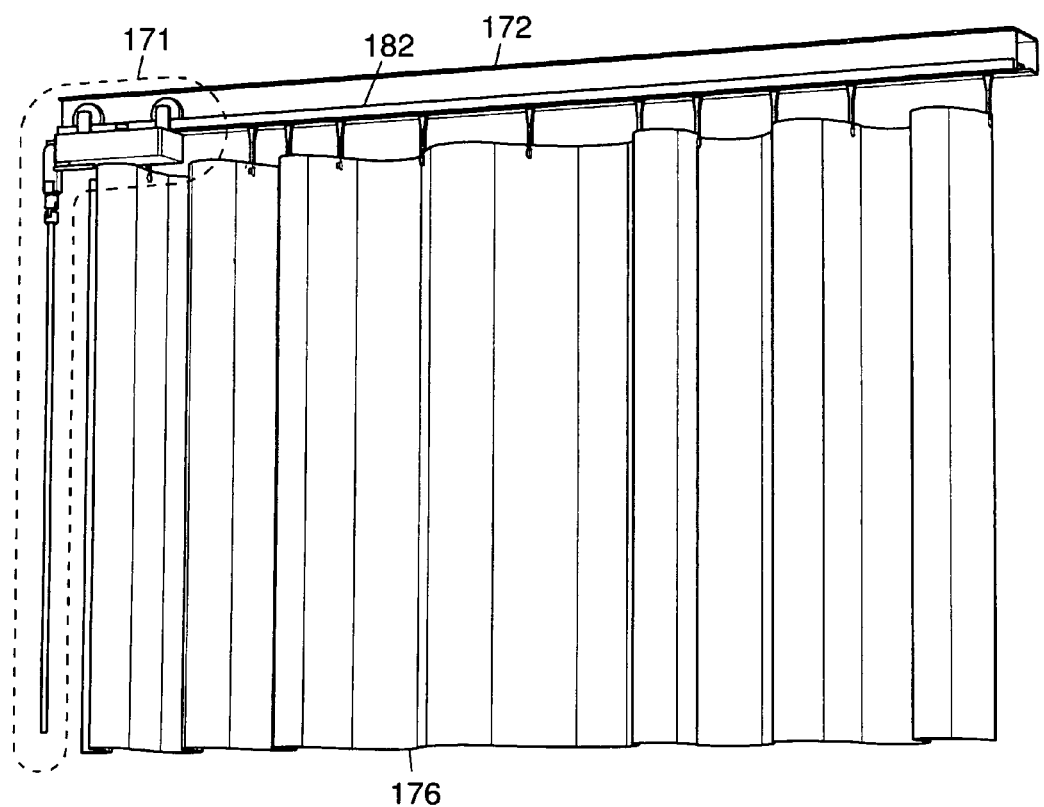
FIG. 14A is a view of an alternate embodiment in which a curtain is the adjustable covering.
Figure 14B:
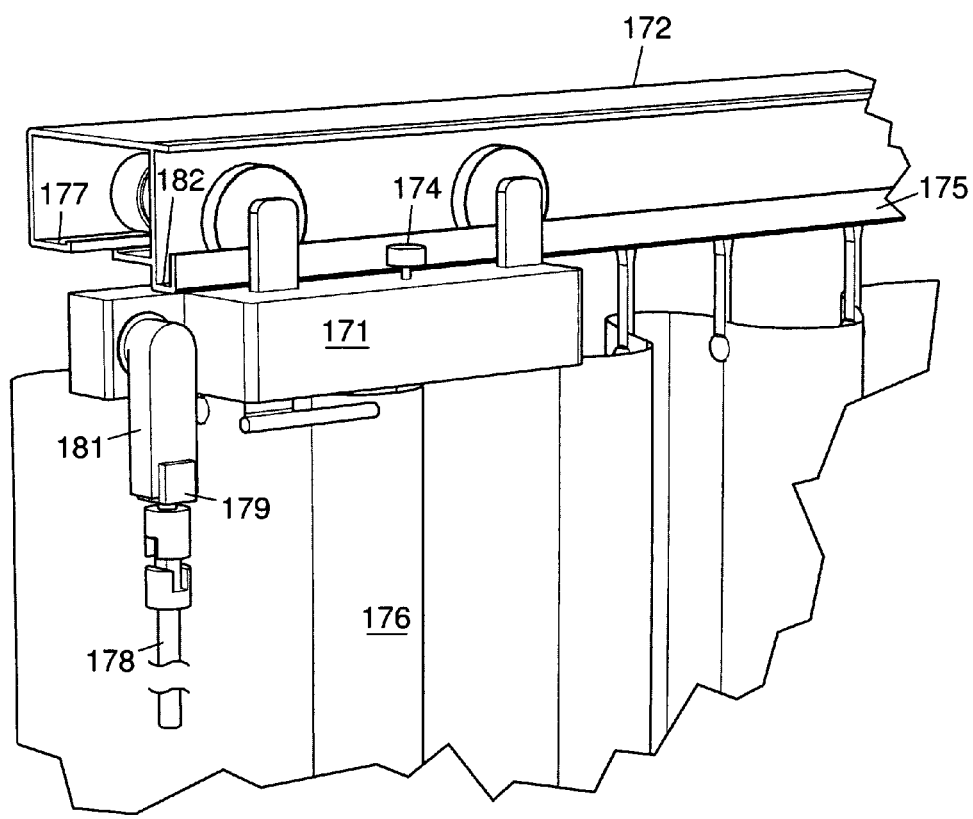
FIG. 14B is a view of salient physical details of an alternate embodiment in which a curtain is the adjustable covering.

Whereas in the first embodiment, a control module 101, and drive motor module 104, both stationary with respect to the architectural opening, actuate a movable window covering of multiple slats, in an alternate embodiment, as depicted in FIG. 14A, a control-and-propulsion module 171 is able to move along a track 182 incorporated into a drapery rod 172, actuating a movable curtain 176. As shown in FIG. 14B, control-and-propulsion module 171, a toothed pinion or drive wheel 174 which engages teeth (not shown) of a drive rack 175 is coupled to the output shaft of a gearmotor 173 (not shown, internal to the module) allowing software control of motorized motion of the module along the track. The control-and-propulsion module 171 connects to the movable end of the curtain 176, which is suspended in a conventional manner from a parallel curtain track 177 within the same drapery rod 172. The user controls comprise a pull wand 178 incorporating a momentary rotary switch 179. The pull wand 178 is configured to hang from a swing arm 181 which is free to be rotated in the plane of the covered opening approximately 10 degrees, both clockwise and counterclockwise from its usual downward position.

Figure 14C:
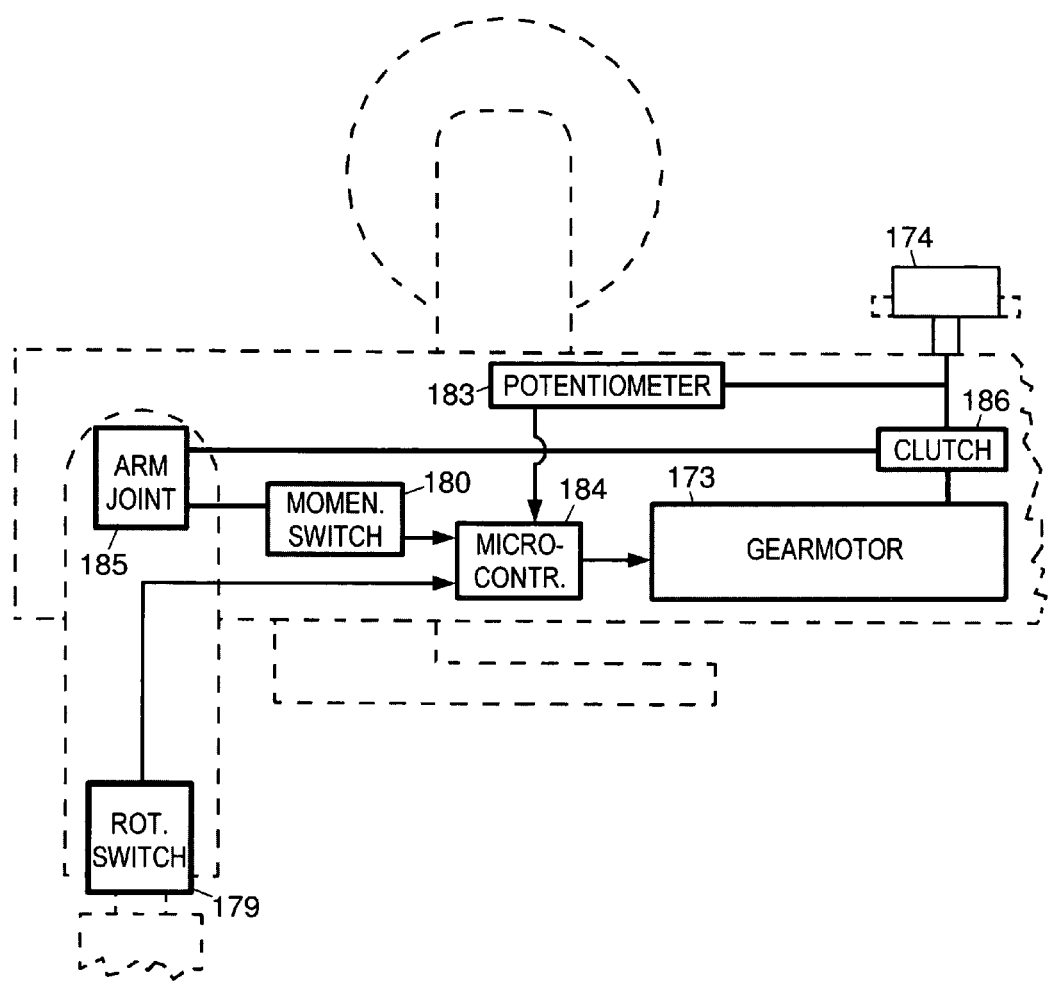
FIG. 14C is a diagram showing the interrelations of key components of an alternate embodiment in which a curtain is the adjustable covering.

In a diagrammatic view of the control-and-propulsion module 171, FIG. 14C shows interactions between internal control components. An arm joint 185 allows for the limited-angle rotation of swing arm 181. The arm joint is mechanically coupled to a clutch 186 which disengages the gearmotor 173 from drive rack 175 when the swing arm 181 is pulled a significant angle to either the right or the left, allowing manual repositioning of the control-and-propulsion module 171 along track 182. The swing arm is also connected to a momentary switch 180 configured such that a signal is provided to the microcontroller 15 (not shown, a component of circuit board 184) when the swing arm is pulled to either side. The rotary switch 179 is configured to provide a signal to the microcontroller when the pull wand 178 is rotated on its vertical axis as described below. The drive wheel 174 is mechanically linked to the wiper of a potentiometer 183, providing an absolute position reference signal to circuit board 184. The potentiometer includes reduction gearing (not shown) such that the entire maximum designed length of track 182 is matched to the usable range of movement of the potentiometer.

A microcontroller 15 and a radio receiver/demodulator 14, as described above in the first embodiment, are included in the circuit board 184, but with the possible addition of motor driver circuit components as needed based on the specific gearmotor and microcontroller selected for a specific design application.

The microcontroller software differs from the description of the first embodiment in several ways. Firstly, a provision for servo control of the control-and-propulsion module 171 linear position based on the signal from the potentiometer 183 is included in this embodiment. Whenever step 32 or step 45 of the software is executed as described above, the control-and-propulsion module 171 moves to the updated position setpoint by means of a servo loop implemented in the microcontroller. Secondly, step 30 of the software for accepting user input of position updates is altered such that whereas in the first embodiment, a change in the digital output of the rotary quadrature encoder 98 indicates a position signal input, in the alternate embodiment the signal from the momentary switch 180 not only indicates a position signal input (signaling manual mode) but necessitates an additional operation of reading the potentiometer signal to obtain the absolute position. Thirdly, the software monitors the rotary switch 179 for presence of a Learn command. The momentary rotary switch 179 is of a type that has a spring return from its normal center position, so that when the pull wand 178 is rotated axially either clockwise or counterclockwise, a Learn command is signaled (with return to auto mode).

The operation of this alternate embodiment differs somewhat from that of the first embodiment, since the adjustable attribute of the curtain is the distance to which the movable edge is drawn closed. The human operator opens or closes the curtain by pulling the control-and-propulsion module 171 to one side or the other, using the pull wand 178. The swing arm 181 is at the same time pulled in the direction of movement, releasing the clutch 186, to disengage the drive wheel 174 from the gearmotor 173. The potentiometer 183 remains coupled to the drive wheel 174, thus the potentiometer senses the adjusted position. The swing arm also actuates the momentary switch 180 while pulled, as described above. When force is no longer being applied to the swing arm, it returns to the normal downward position, the clutch 186 re-engages, and the momentary switch 180 returns to its normal position. The human operator issues a Learn command not by pulling, but by axially rotating the pull wand, actuating the rotary switch 179.

Implications of Microcontroller Selection and Design

Whereas in the first embodiment, a PIC16F877A microcontroller is described, in alternate embodiments other types of microcontroller may be more suitable for specific benefits. Whereas a microcontroller is commonly considered to be a low-cost, single chip that includes the functional parts of central processing unit (CPU), non-volatile program memory, random access memory, and an I/O control unit, in this context a microcontroller refers to the same parts, but not necessarily all in a single chip. Furthermore, the microcontroller may be understood to include combinational and sequential logic implementing the operations specified in the software description above.

CONCLUSION

The use of time-and-date broadcasts provides a reliable, precise reference of celestial solar position, facilitating automation of window coverings and the like. The solar position reference provides a useful framework for logging of an end user's preferences when window coverings are adjusted, and for subsequent automatic adjustments from the logged data. The user is never required to set, read, or even acknowledge the actual time and date when user setting are logged, thus providing a level of conceptual simplicity not suggested in related prior art.

As will be apparent to one of ordinary skill in the art, the invention may be embodied alternately as an add-on product, a retrofit of a previously installed covering, a method, a stand-alone system, and/or a distributed system. Furthermore, the methods of control disclosed herein may be embodied as the exclusive mode of operation for a covering, or as one mode of operation out of a set of modes integrated into a more comprehensive automation system.

Advantages and benefits have been described above within specific embodiments for the purpose of concise disclosure. Even so, the benefits, advantages, suitability for solution of problems, as well as any aspect that may cause any benefit, advantage, or solution to occur or be increased in effect are not to be construed as critical or required features or elements with regard to any of the claims herein.

What is claimed is:

1. A method of controlling a covering for a window according to both a timetable and a calendar, said covering having at least one attribute of function that is adjustable, said window being a feature of a building, said building designed for human occupancy, said building having attributes of geographic location and orientation, said window being subject to illumination from the sun, said illumination generally varying in many characteristics during both the solar year and the day in said geographic location, said location being within the usable broadcast range of a radio time standard signal, said signal being available for public benefit, said method consisting of both a) an initialization sub-method and b) a routine function sub-method, where the initialization sub-method preferably is prerequisite to the routine function sub-method, where the initialization sub-method comprises the operations of:
   a) accepting input of data defining the approximate geographic location of the installation, and
   b) registering said approximate geographic location, and
where the routine function sub-method comprises the operations of:
   a) registering periodically the approximate day of the year,
   b) registering and updating repetitively the approximate time of day with respect to local celestial solar position,
   c) determining the approximate moment of local sunset for the approximate day of year, based on said approximate geographic location,
   d) allowing a human occupant of said building to make interactive changes to said adjustable attribute of the covering, and
   e) reverting the covering automatically to a previously determined value of said adjustable attribute, at a moment of time functionally related to said moment of local sunset as determined, thereby negating any recent interactive changes to said adjustable attribute,
whereby a person can freely adjust and re-adjust a window covering during daylight hours, needing to perform no further action in order for the closing the window covering at dusk to occur.

2. The method of claim 1, wherein:
   a) said solar year is internally represented as being divided into a plurality of predetermined solar year segments with respect to solar seasons;
   b) the duration of every day is internally represented as divided into a predetermined number of identifiable day segments; and
   c) said user interface further has a means to accept a user-issued learn command, said learn command causing the internal function of storing the current position setting in a data structure which associates the given position setting with both i) the applicable solar year segment, and ii) the applicable day segment;
whereby a person can adjust a window covering at a particular time on particular day while designating that a similar adjustment will be repeated automatically on future days, at approximately the same time of day, and in future years when the time of year is approximately the same.

3. The method of claim 1, further comprising the operations of:
   a) determining the approximate moment of local sunrise for the approximate day of year, based on said approximate geographic location, and
   b) adjusting automatically to a previously determined value of said adjustable attribute, at a moment of time functionally related to said moment of local sunrise as determined,
whereby building occupants can benefit from sunlight by day, and have privacy at night, even on days when no occupant makes any window covering adjustments.

4. The method of claim 3, wherein with the passing of time, when a successive solar year segment is entered:
   a) if any settings exist from the previous year for that solar year segment, then the previous year's settings are put into use; whereas
   b) if no settings exist from the previous year for that solar year segment, then any settings stored for the preceding solar year segment are, in effect, copied to the newly-entered solar year segment and put into use,
whereby user-issued settings may by default be carried forward in a manner that is conceptually simple to the user.

5. The method of claim 3, wherein the physical input of user adjustment of said adjustable attribute is by a first human-issued physical impetus of a hand-holdable rotary handle, said handle also being a means by which said learn command is communicated to the control system by a second human-issued physical impetus,
whereby a person, who may be visually impaired, having located and grabbed an adjusting wand or rod is able not only adjust to a window covering but also to issue a learn command, without also having to search for, and touch, a second user-interface.

6. A method for controlling at least one adjustable covering for an architectural opening, said architectural opening having attributes of geographic location and orientation, said covering having at least one attribute of function that is adjustable, said architectural opening being located within an exterior surface of a building, said exterior surface being exposed to local weather and climate conditions, said weather and climate conditions generally varying in multiple characteristics during the solar year in said geographic location, said location being within the usable broadcast range of a radio time standard signal, said signal being available for public benefit, said method comprising:
   a) receiving at least one time reference radio broadcast signal, said signal being broadcast independently of, and externally to, the invention, said signal including reference information comprising both time and date;
   b) demodulating at least one of the time reference signals into at least one time- and date-encoded message;
   c) decoding at least one of said time- and date-encoded messages into at least one set of data referencing the current time of day and elapsed time of year;

d) registering within at least one digital control unit said data referencing the current time of day and the elapsed time of year;

e) updating repetitively the currently-registered time of day and the currently-registered time of year within at least one of said digital control units independently of said messages received from said broadcast signal, said updating performed by one or both of the following methods: i) receiving a timing signal from an included electronic timing means, and ii) repetitively receiving and decoding a plurality of additional instances of said time- and date-encoded messages; and f) automatically adjusting said adjustable covering at least once, in accordance with conditions of i) the time of day as determined, and ii) the approximate time of year as determined, and iii) at least one previously ordained rule as represented within at least one of said digital control units;

whereby an adjustable covering can adjust itself to particular adjustment settings at predetermined times of day according to a timetable, without the need for a human operator to ever set a clock, read a clock display, nor verify the correctness of a clock, and whereby the adjustment settings programmed into the covering may be designated to selectively function at specific times of the year according to a programmed calendar.

7. The method of claim 6, further comprising:
a) registering at least one command interactively from a human operator, employing at least one user interface means in communication with said digital control unit, at least one of said commands representing a manner of adjustment; and
b) responding to at least one of said commands by adjusting said adjustable covering in a manner specified in the command,
whereby a human operator can interactively choose and designate the adjustment settings to which the window covering will automatically adjust, at predetermined times of day, on future days.

8. The method of claim 6, further comprising the conversion of solar illumination into electric power by at least one photovoltaic cell, said solar illumination passing substantially into the bounded area of said architectural opening, and providing said electric power as a means to adjust said adjustable covering.

9. The method of claim 6, further comprising:
a) registering at least one learn command from a human operator, employing at least one user interface means in communication with said digital control unit; and
b) responding to at least one of said learn commands by logging within a memory means, at least one numeric value having a functional relationship to a current adjusted value of said adjustable covering, said logging within a memory means further being indexed to the approximate registered time of day and the approximate registered time of year contemporaneous to the issuance of said learn command,
whereby a human operator can interactively choose and designate the approximate times of day at which said window covering will automatically adjust to designated adjustment settings at future times of day, on future days, at specific times of year.

10. The method of claim 9, further comprising the detecting of the introduction of a removable key, the introduction of said key being a requirement upon said human operator in order for the registering of said learn command to proceed.

11. The method of claim 9, further comprising:
a) recalling at least one of said numeric values when i) said currently-registered time of day again corresponds to the indexed logged time of day of said numeric value and ii) said currently-registered time of year corresponds to the indexed logged time of year of said numeric value,
b) applying said functional relationship to the recalled numeric value, and
c) re-adjusting said adjustable covering according to the resulting value.

12. The method of claim 11, wherein said functional relationship between said numeric value and said adjusted value of said adjustable covering is identity.

13. The method of claim 11, wherein said functional relationship between said numeric value and said adjusted value of said adjustable covering includes a second numeric value obtained by a method selected from a group consisting of:
a) sensing and quantifying cloudiness in the sky surrounding said architectural opening,
b) sensing and quantifying heat transfer through said architectural opening,
c) sensing and quantifying exterior temperature in the vicinity of said architectural opening, and
d) referencing a functional relationship represented in a data structure, said data structure represented within at least one of said digital control units, said functional relationship correlated to seasonal climate patterns for the approximate geographic location of said adjustable covering, indexed by approximate time of year.

14. An automatically-controlled window covering for installation within the bounded area of a window of a building, said building having a predetermined geographic location and orientation, said building having at least one interior room, said window having an exterior side that is exposed to local weather and climate conditions, said weather and climate conditions generally varying in multiple characteristics during the solar year in said geographic location, the location being within the usable broadcast range of a radio time standard signal, said signal being available for public benefit, said automatically-controlled window covering comprising:
a) a conventional window covering, having at least one adjustable attribute, the variation of at least one of said adjustable attributes being capable of regulating at least one characteristic selected from the group consisting of i) viewability of an interior portion of the building by an exterior observer, ii) a convection of air between the exterior and the interior of the building across the bounded area of the window, iii) an overall thermal insulating ability of the window covering, and iv) an amount of exterior light which may pass to the interior of the building across the bounded area of the window;
b) an antenna for receiving said signal;
c) a radio broadcast time receiver circuit for i) detecting and demodulating said signal, and ii) decoding digital data from said antenna, said digital data comprising the time and date;
d) at least one microcontroller for registering said time and date, and for signaling adjustments to said window covering in accordance with a time schedule and calendar, said schedule and calendar having a daily cyclical structure combined with a yearly cyclical structure, said schedule and calendar being functionally represented in at least one digital memory device; and
e) an electromechanical actuation means;

whereby an electrical signal from at least one of said microcontrollers is converted into a physical adjustment of at least one of said adjustable attributes of the window covering;

whereby scheduled window covering adjustments may occur automatically throughout the local solar day, with cyclical, reliable, precise timing; and whereby seasonal variations in daily adjustment schedule are automatically introduced and reintroduced into the daily schedule as predetermined, repeating in a yearly cycle.

15. The automatically-controlled window covering of claim 14, further including at least one photovoltaic cell as a source of electrical power to operate said electromechanical actuation means.

16. The automatically-controlled window covering of claim 14, further comprising a user interface means by which the issuance of at least one learn command from a human operator is communicated to at least one of said microcontrollers, causing the recording of at least one numeric value having a functional relationship to a current adjusted value of said adjustable covering, said recording occurring within at least one of said digital memory devices, said recording further being indexed to an approximate registered time of day and to an approximate registered time of year contemporaneous to the issuance of said learn command, whereby a human operator may interactively add elements to the set of said scheduled window covering adjustments.

17. The automatically-controlled window covering of claim 16, wherein
   a) instances of the local solar day are represented within at least one of said microcontrollers as divided into intervals, where each whole day is divided into a daylight interval and a non-daylight interval, the length of said non-daylight interval varying as a function of said registered time of year and said geographic location; and
   b) the daylight interval is further subdivided into a predetermined number of day segments, the boundaries between said day segments being determined by the time as registered, said day segments being of sufficiently long duration that within a single day segment, a human operator is able to make individual adjustments to a plurality of separate installations of the invention, said separate installations being in a plurality of windows within said building, said individual adjustments each being accompanied by said learn command, whereby individual automatic adjustments of a plurality of automated window coverings may be synchronized with precision, yet without intercommunication between the window coverings, without precise timing on the part of the human operator, and without any local installation, operation, or maintenance of a central control system.

* * * * *